United States Patent
Aga et al.

(10) Patent No.: US 12,010,288 B2
(45) Date of Patent: Jun. 11, 2024

(54) INFORMATION PROCESSING DEVICE, INFORMATION PROCESSING METHOD, AND PROGRAM

(71) Applicant: SONY GROUP CORPORATION, Tokyo (JP)

(72) Inventors: Hiroyuki Aga, Tokyo (JP); Atsushi Ishihara, Kanagawa (JP); Mitsuru Nishibe, Chiba (JP); Koichi Kawasaki, Tokyo (JP); Hirotake Ichikawa, Kanagawa (JP); Hajime Wakabayashi, Tokyo (JP); Shunitsu Kohara, Tokyo (JP); Ryosuke Murata, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 547 days.

(21) Appl. No.: 17/288,314

(22) PCT Filed: Sep. 30, 2019

(86) PCT No.: PCT/JP2019/038444
§ 371 (c)(1),
(2) Date: Apr. 23, 2021

(87) PCT Pub. No.: WO2020/090316
PCT Pub. Date: May 7, 2020

(65) Prior Publication Data
US 2021/0377515 A1 Dec. 2, 2021

(30) Foreign Application Priority Data
Nov. 2, 2018 (JP) ................................ 2018-207085

(51) Int. Cl.
*H04N 13/363* (2018.01)
*G06T 7/73* (2017.01)
(Continued)

(52) U.S. Cl.
CPC ............ *H04N 13/363* (2018.05); *G06T 7/73* (2017.01); *H04N 13/111* (2018.05); *H04N 13/275* (2018.05); *H04N 13/344* (2018.05)

(58) Field of Classification Search
CPC .......... G06F 3/012; G06F 3/011; G06F 3/013; G06T 19/006; G02B 2027/0187;
(Continued)

(56) References Cited

U.S. PATENT DOCUMENTS 9,805,514 B1 * 10/2017 Benko ...................... G06F 3/011
2017/0372457 A1 12/2017 Sylvan et al.

FOREIGN PATENT DOCUMENTS

| JP | 2015-095045 A | 5/2015 |
| JP | 2018-525693 A | 9/2018 |
| WO | WO 2017/183346 A1 | 10/2017 |

* cited by examiner

*Primary Examiner* — Koosha Sharifi-Tafreshi
(74) *Attorney, Agent, or Firm* — Paratus Law Group, PLLC

(57) ABSTRACT

An information processing device including: an acquisition unit that acquires information according to a recognition result of position and posture of a viewpoint; a projection processing unit that projects a target object based on position and posture of a first viewpoint onto a first projection surface defined in association with the first viewpoint, associates second information according to relative position and posture relationship between the first viewpoint and the object with first information according to a result of the projection; a correction processing unit that restores three-dimensional information of the object based on the first and second information, and reprojects the object according to relative position and posture relationship between the restored object and a second viewpoint onto a second projection surface defined in association with the second viewpoint; and an
(Continued)

output control unit that causes an output unit to present display information according to a result of the reprojection.

20 Claims, 24 Drawing Sheets

(51) Int. Cl.
*H04N 13/111* (2018.01)
*H04N 13/275* (2018.01)
*H04N 13/344* (2018.01)

(58) Field of Classification Search
CPC .......... G02B 27/017; G02B 2027/0178; G09G 2320/0261; H04N 13/117; H04N 13/383; H04N 13/279; H04N 13/366; H04N 13/373; H04N 13/371; H04N 13/378; H04N 13/376; H04N 13/38
USPC .................................................. 345/7–9, 633
See application file for complete search history.

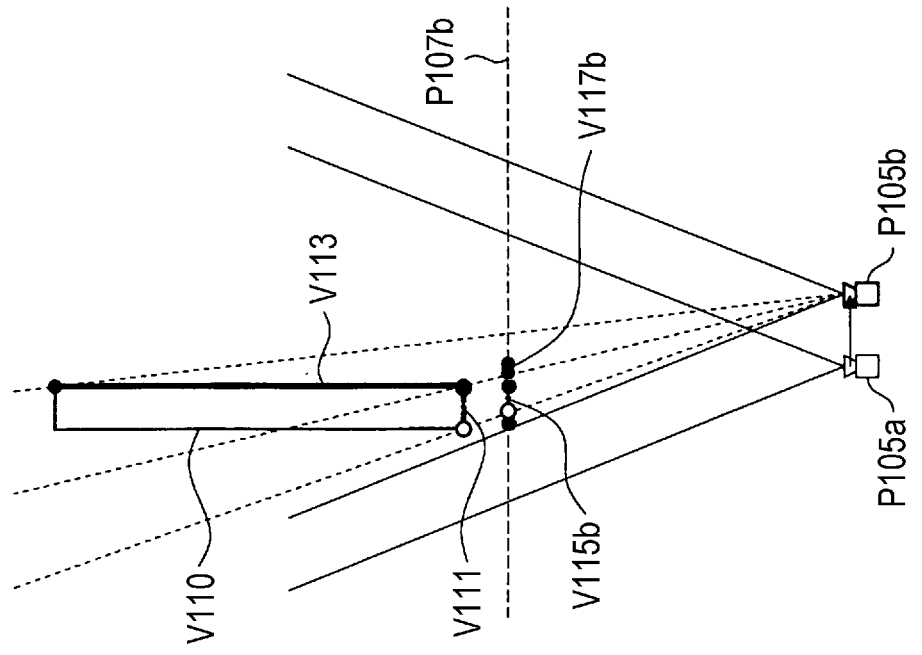
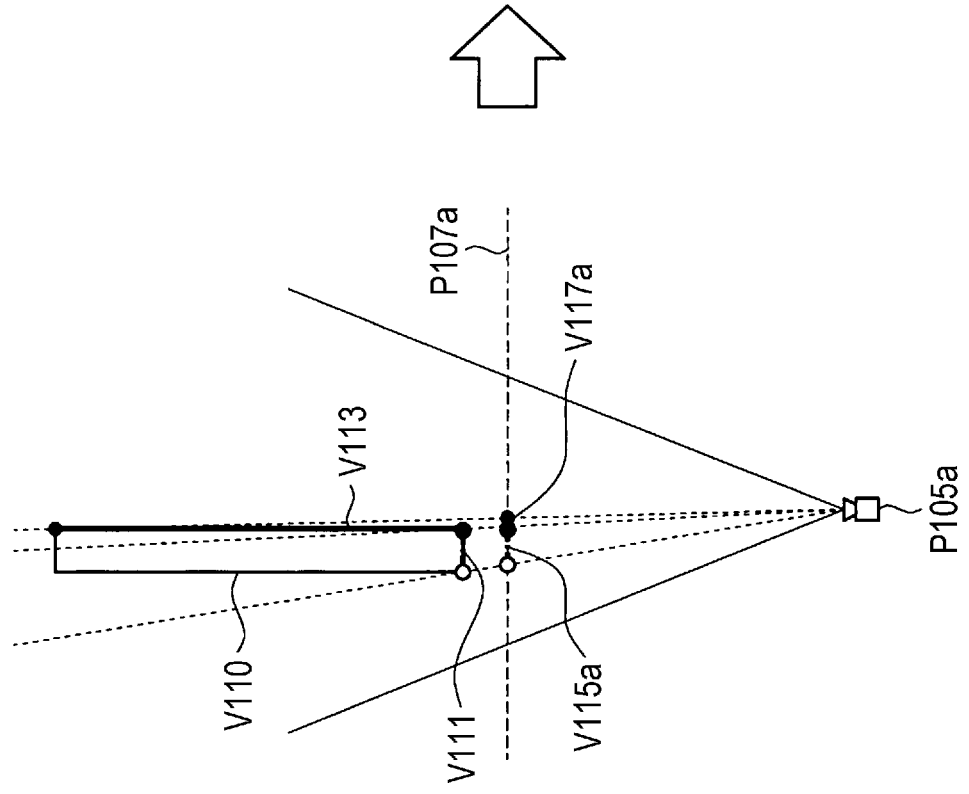
FIG. 5

FIG. 10
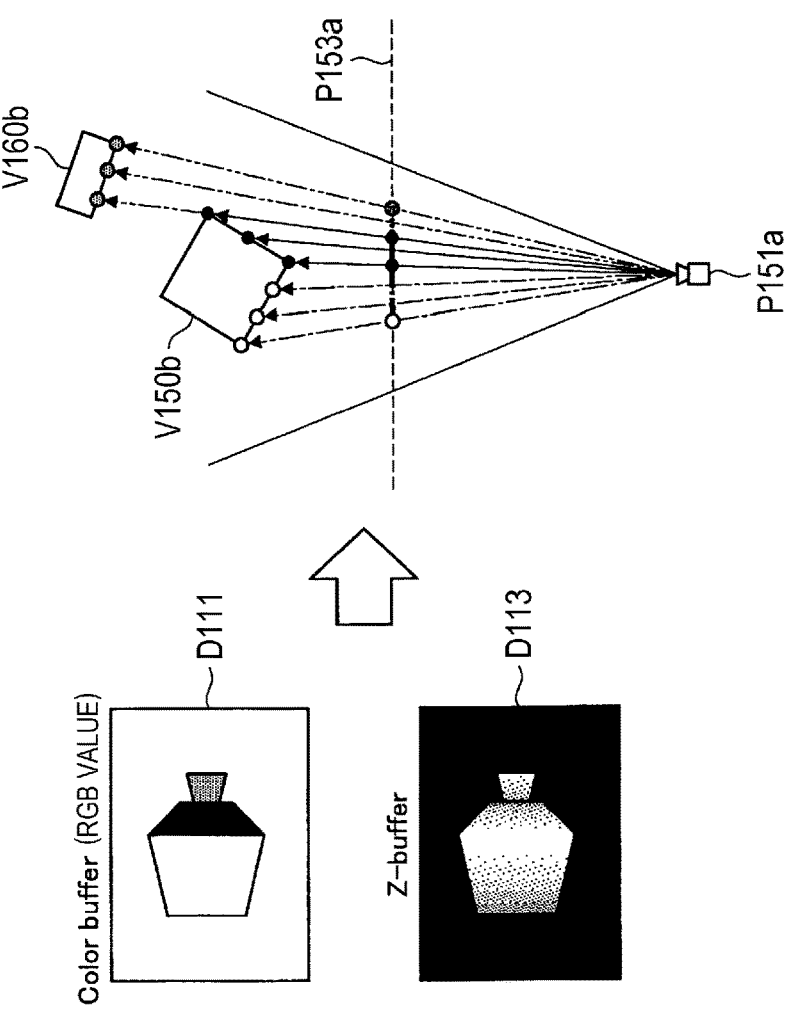
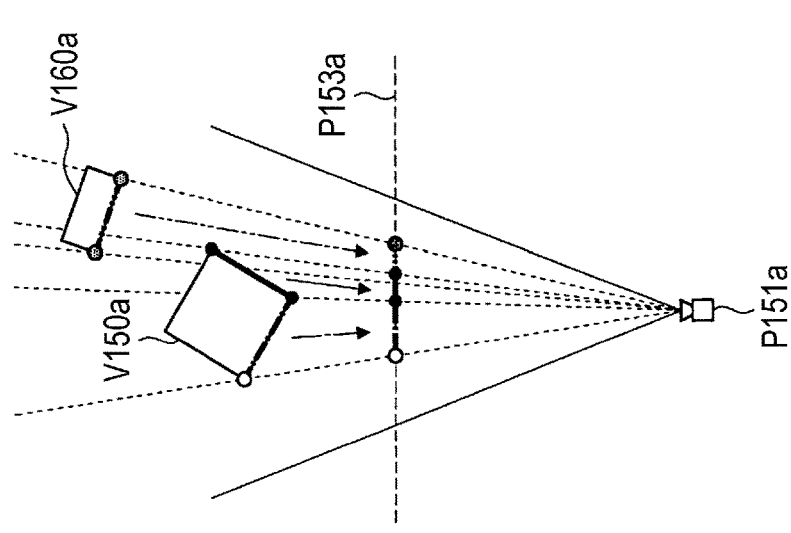

FIG. 14
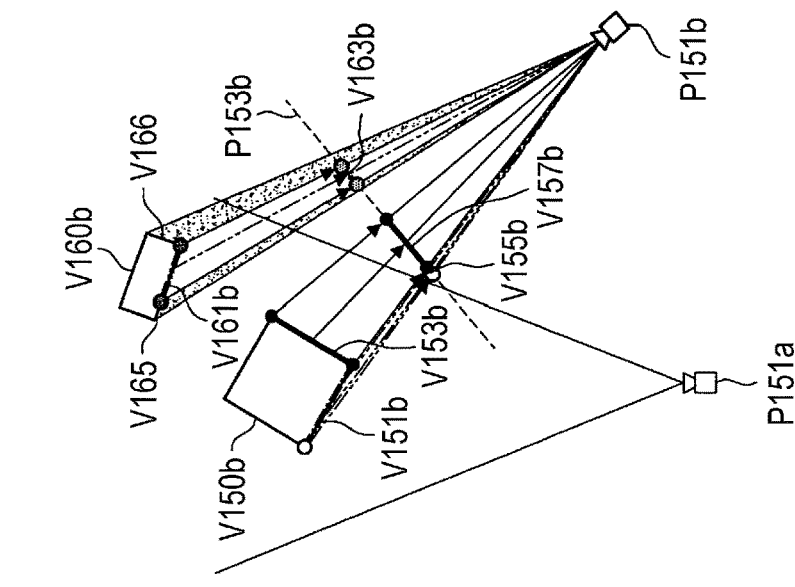
PROJECTION AND DRAWING OF VIRTUAL OBJECT
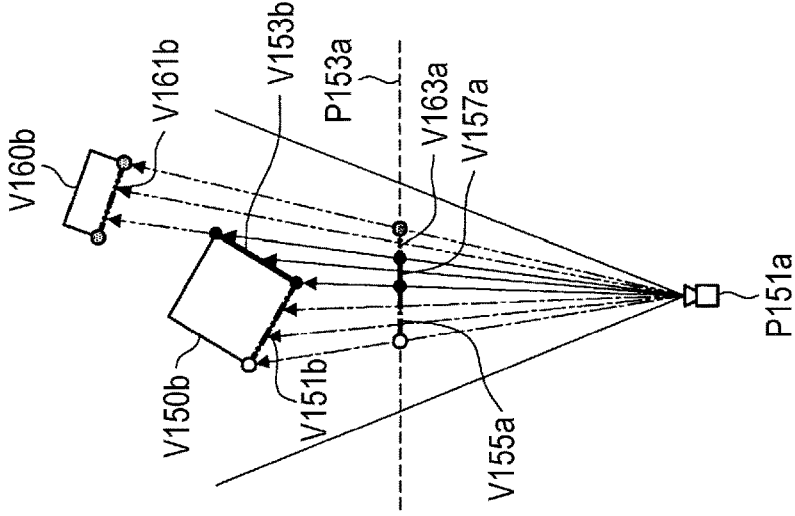
RESTORATION OF VIRTUAL OBJECT
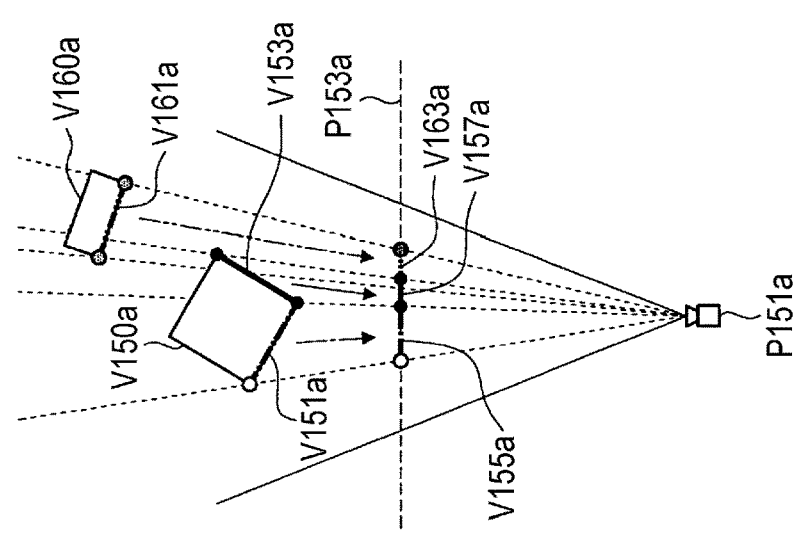
REPROJECTION OF VIRTUAL OBJECT FIG. 16
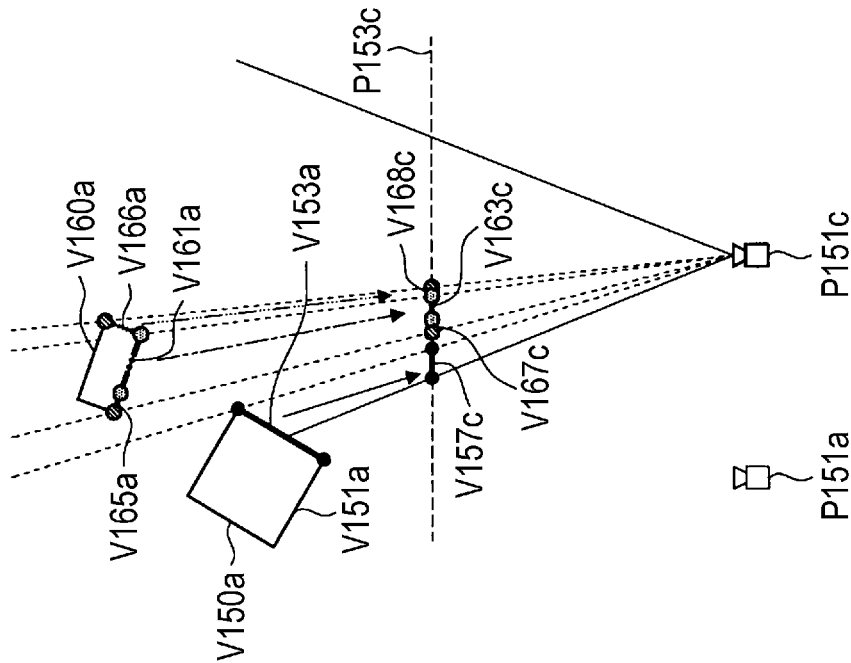
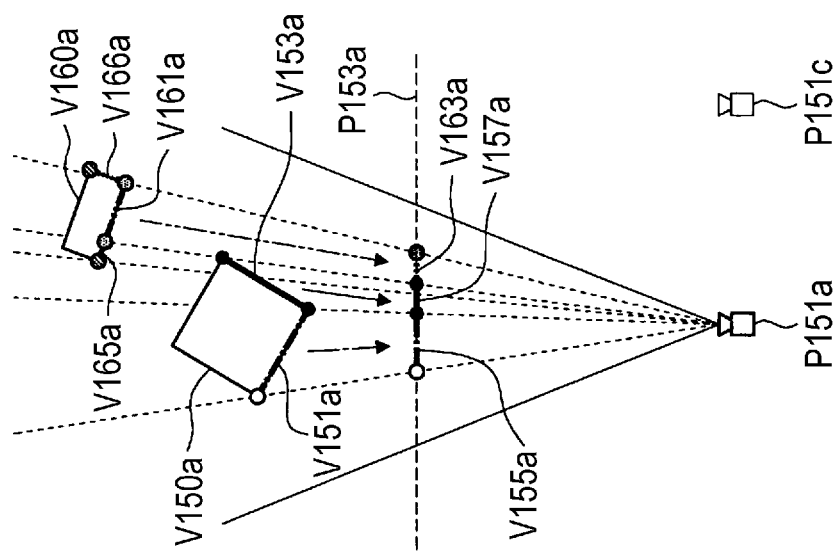

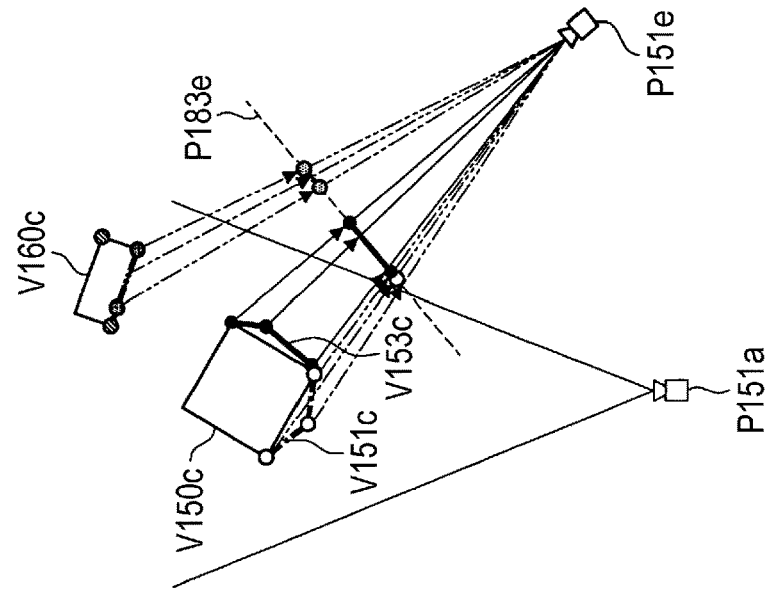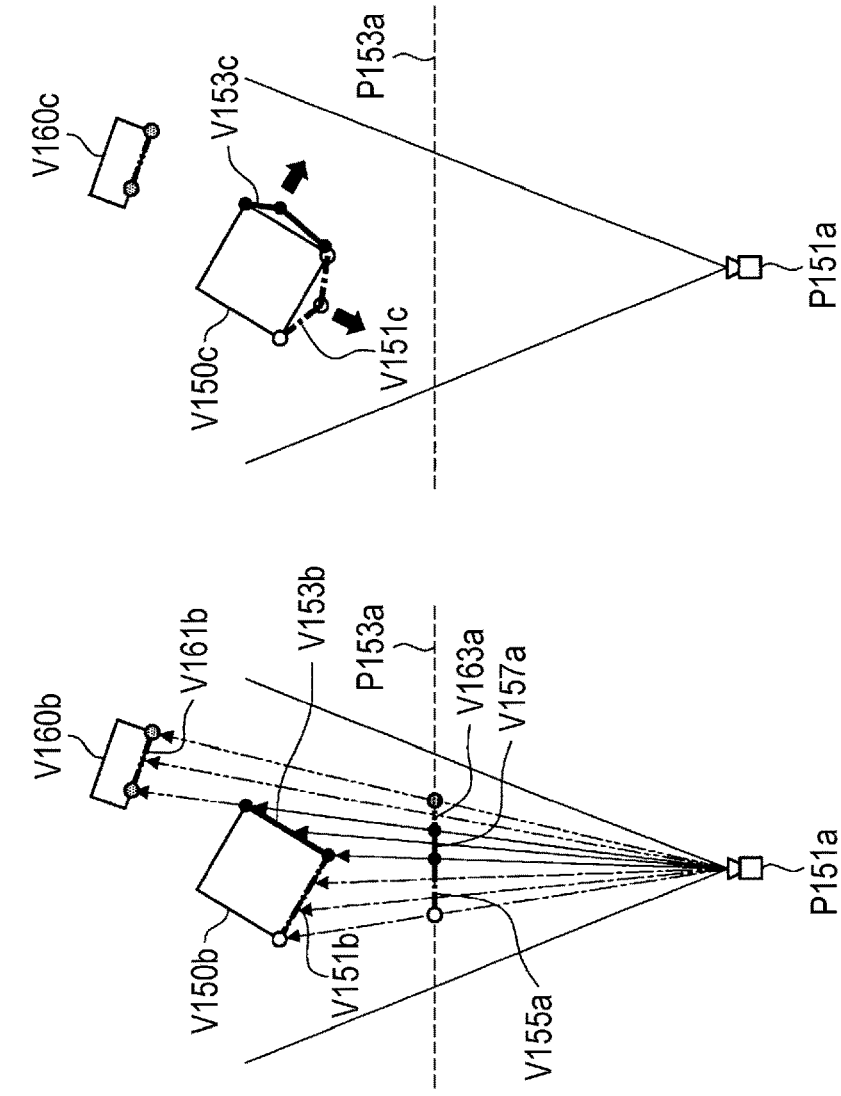
FIG. 18

FIG. 21
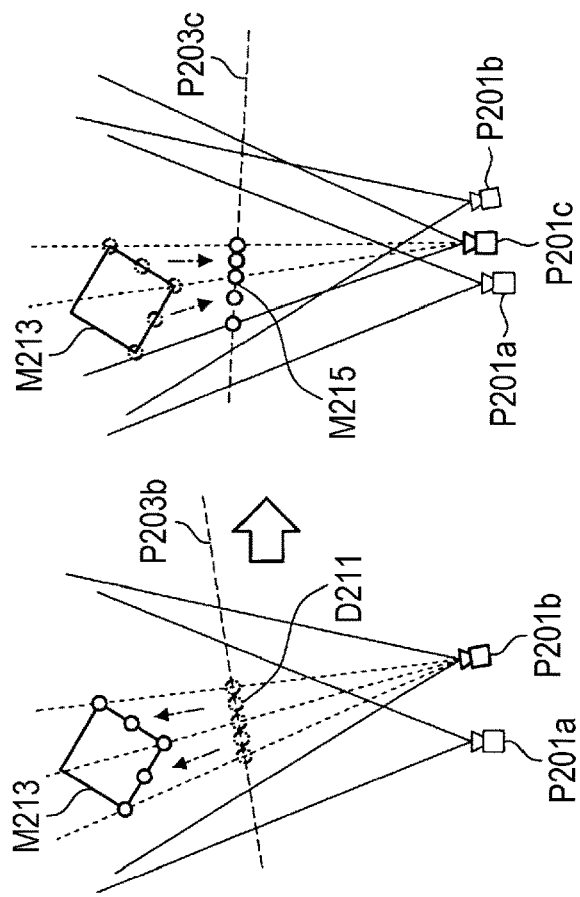
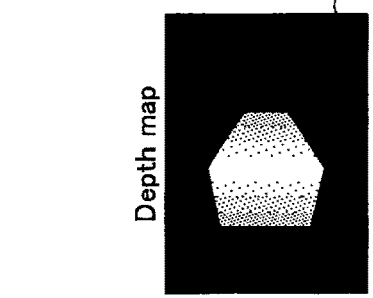
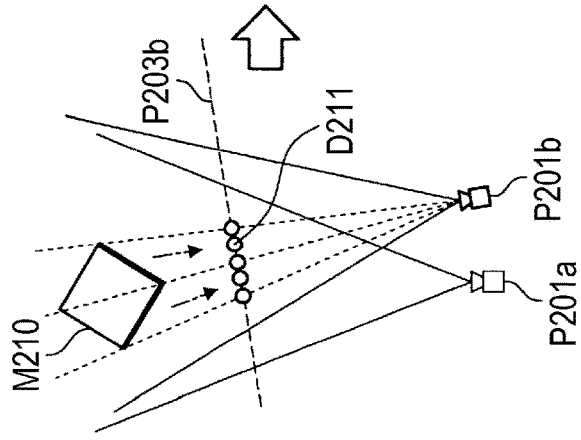

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2019/038444 (filed on Sep. 30, 2019) under 35 U.S.C. § 371, which claims priority to Japanese Patent Application No. 2018-207085 (filed on Nov. 2, 2018), which are all hereby incorporated by reference in their entirety.

TECHNICAL FIELD

The present disclosure relates to an information processing device, an information processing method, and a program.

BACKGROUND ART

In recent years, with the advancement of image recognition technology, it has been possible to recognize the position and posture of a real object (i.e., body in real space) included in an image captured by an image capturing device. As one application example of such object recognition, there is a technology called augmented reality (AR). By using AR technology, virtual contents of various modes such as text, icons, and animation (hereinafter referred to as "virtual object") can be superimposed on a body in real space (hereinafter also referred to as "real object") and be presented to the user. For example, Patent Document 1 discloses an example of a technology for presenting virtual contents to the user by using AR technology.

CITATION LIST

Patent Document

Patent Document 1: International Patent Application Publication No. 2017/183346

SUMMARY OF THE INVENTION

Problems to be Solved by the Invention

Incidentally, depending on the virtual object to be presented, the load related to processing of drawing the virtual object as display information such as an image becomes relatively high, and there may be a delay between the start of drawing the virtual object and the output as display information. For this reason, for example, if, due to the delay, the position or posture of the viewpoint of the user changes before a drawn virtual object is presented to the user as display information, there may be a deviation in the relative position and posture relationship between the viewpoint and the position where the drawn virtual object is superimposed. Such a deviation may be recognized by the user as a positional deviation in the space where the virtual object is superimposed, for example. This applies not only to AR but also to so-called virtual reality (VR) in which virtual objects are presented in an artificially constructed virtual space.

As an example of a method for solving the above problem, there is a method of reducing (ideally eliminating) the influence of the above-mentioned deviation by correcting (e.g., correction of presented position or change of shape) display information according to the drawing result of a virtual object on the basis of the position and posture of the viewpoint after the drawing. However, with the conventional method, there have been cases where it is difficult to accurately reflect the three-dimensional position and posture relationship between the viewpoint and the virtual object at the time of correction.

Against this background, the present disclosure proposes a technology that makes it possible to present information according to the position and posture of the viewpoint in a more preferable manner.

Solutions to Problem

According to the present disclosure, there is provided an information processing device including: an acquisition unit that acquires information according to a recognition result of the position and posture of a viewpoint; a projection processing unit that projects a target object on the basis of the position and posture of a first viewpoint onto a first projection surface defined in association with the first viewpoint, and associates second information according to the relative position and posture relationship between the first viewpoint and the object with first information according to a result of the projection; a correction processing unit that restores three-dimensional information of the object on the basis of the first information and the second information, and reprojects the object according to the relative position and posture relationship between the restored object and a second viewpoint onto a second projection surface defined in association with the second viewpoint; and an output control unit that causes an output unit to present display information according to a result of the reprojection.

Additionally, according to the present disclosure, there is provided an information processing method performed by a computer, the method including: acquiring information according to a recognition result of the position and posture of a viewpoint; projecting a target object on the basis of the position and posture of a first viewpoint onto a first projection surface defined in association with the first viewpoint, and associating second information according to the relative position and posture relationship between the first viewpoint and the object with first information according to a result of the projection; restoring three-dimensional information of the object on the basis of the first information and the second information, and reprojecting the object according to the relative position and posture relationship between the restored object and a second viewpoint onto a second projection surface defined in association with the second viewpoint; and causing an output unit to present display information according to a result of the reprojection.

Additionally, according to the present disclosure, there is provided a program that causes a computer to acquire information according to a recognition result of the position and posture of a viewpoint, project a target object on the basis of the position and posture of a first viewpoint onto a first projection surface defined in association with the first viewpoint, and associate second information according to the relative position and posture relationship between the first viewpoint and the object with first information according to a result of the projection, restore three-dimensional information of the object on the basis of the first information and the second information, and reproject the object according to the relative position and posture relationship between the restored object and a second viewpoint onto a second projection surface defined in association with the second viewpoint, and cause an output unit to present display information according to a result of the reprojection.

BRIEF DESCRIPTION OF DRAWINGS

FIG. 5 is an explanatory diagram for describing an outline of another example of processing related to correction of display information according to the position and posture of a viewpoint.

FIG. 10 is an explanatory diagram for describing an outline of Example 1 of the information processing system according to the same embodiment.

FIG. 14 is an explanatory diagram for describing an outline of an information processing system according to Modification 1.

FIG. 16 is an explanatory diagram for describing an outline of the information processing system according to Modification 1.

FIG. 18 is an explanatory diagram for describing an outline of an information processing system according to Modification 2.

FIG. 21 is an explanatory diagram for describing an outline of the information processing system according to Modification 3.

MODE FOR CARRYING OUT THE INVENTION

Hereinafter, preferred embodiments of the present disclosure will be described in detail with reference to the accompanying drawings. Note that in the present specification and the drawings, components having substantially the same functional configuration will be assigned the same reference signs and redundant description will be omitted.

Note that the description will be given in the following order.
1. Overview
　1.1. Schematic configuration
　1.2. Configuration of input/output device
　1.3. Principle of self-localization
2. Consideration of display correction according to delay between movement of viewpoint and presentation of information
3. Technical features
　3.1. Basic idea
　3.2. Functional configuration
　3.3. Processing
　3.4. Example
　3.5. Modification
4. Hardware configuration
　4.1. Configuration example as device capable of independent operation
　4.2. configuration example when implemented as chip
5. Conclusion

1. OVERVIEW 1.1. Schematic Configuration

Figure 1:
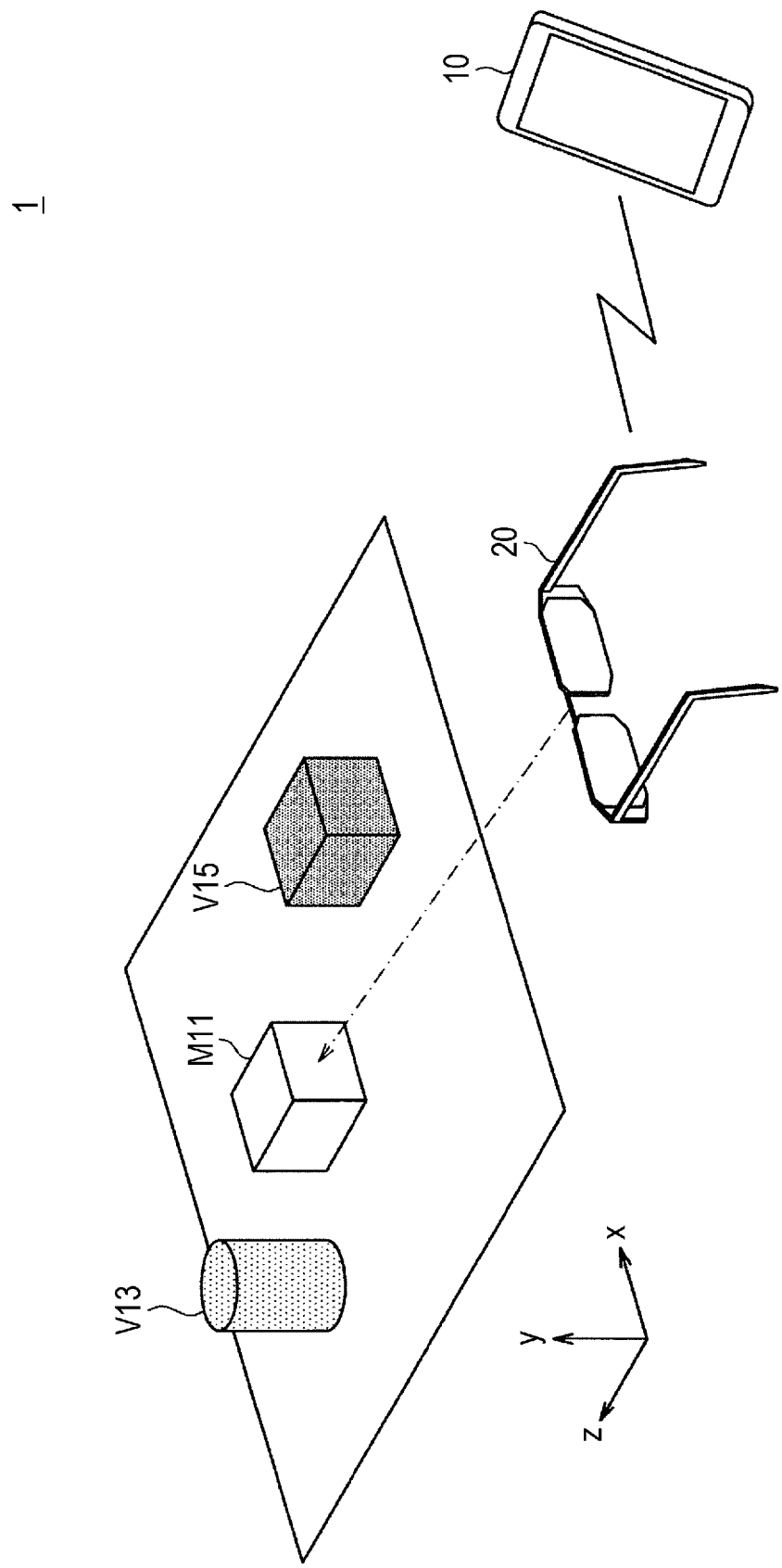
FIG. 1 is an explanatory diagram for describing an example of a schematic configuration of an information processing system according to an embodiment of the present disclosure.

First, an example of a schematic configuration of an information processing system according to an embodiment of the present disclosure will be described with reference to FIG. 1. FIG. 1 is an explanatory diagram for describing an example of a schematic configuration of the information processing system according to the embodiment of the present disclosure. In FIG. 1, reference sign M11 schematically shows a body (i.e., real object) located in real space. Additionally, reference signs V13 and V15 schematically show virtual contents (i.e., virtual objects) presented so as to be superimposed on real space. That is, an information processing system 1 according to the present embodiment superimposes a virtual object on a body in real space such as the real object M11 and presents it to the user, on the basis of so-called augmented reality (AR) technology. Note that in FIG. 1, both a real object and a virtual object are presented for a better understanding of the features of the information processing system according to the present embodiment.

As shown in FIG. 1, the information processing system 1 according to the present embodiment includes an information processing device 10 and an input/output device 20. The information processing device 10 and the input/output device 20 are capable of exchanging information through a predetermined network. Note that the type of network connecting the information processing device 10 and the input/output device 20 is not particularly limited. As a specific example, the network may be a so-called wireless network such as a network based on the Wi-Fi (registered trademark) standard. Additionally, as another example, the network may be the Internet, a dedicated line, a local area network (LAN), a wide area network (WAN), or the like. Additionally, the network may include multiple networks, and at least some of the networks may be a wired network. Additionally, the information processing device 10 may be a device capable of communicating with another device through a wireless communication path such as a smartphone or the like. In this case, the input/output device 20 may be a wearable display provided as an accessory of the smartphone, for example. That is, the input/output device 20 may be a device (e.g., wearable device) that operates in conjunction with the information processing device 10 as a smartphone or the like by being connected to the information processing device 10 through a network as described above.

The input/output device 20 is a configuration for acquiring various input information and presenting various output information to the user holding the input/output device 20. Additionally, presentation of the output information by the input/output device 20 is controlled by the information processing device 10 on the basis of the input information acquired by the input/output device 20. For example, the input/output device 20 acquires information for recognizing the real object M11 as input information, and outputs the acquired information to the information processing device 10. The information processing device 10 recognizes the position of the real object M11 in real space (i.e., absolute coordinates of real object M11) on the basis of the information acquired from the input/output device 20, and causes the input/output device 20 to present the virtual objects V13 and V15 on the basis of the recognition result. With such control, the input/output device 20 can present the virtual objects V13 and V15 to the user on the basis of so-called AR technology, so that the virtual objects V13 and V15 are superimposed on the real object M11. Note that while the input/output device 20 and the information processing device 10 are shown as different devices in FIG. 1, the input/output device 20 and the information processing device 10 may be integrated. Additionally, details of the configuration and processing of the input/output device 20 and the information processing device 10 will be described later.

Hereinabove, an example of a schematic configuration of the information processing system according to the embodiment of the present disclosure has been described with reference to FIG. 1.

1.2. Configuration of Input/Output Device

Figure 2:
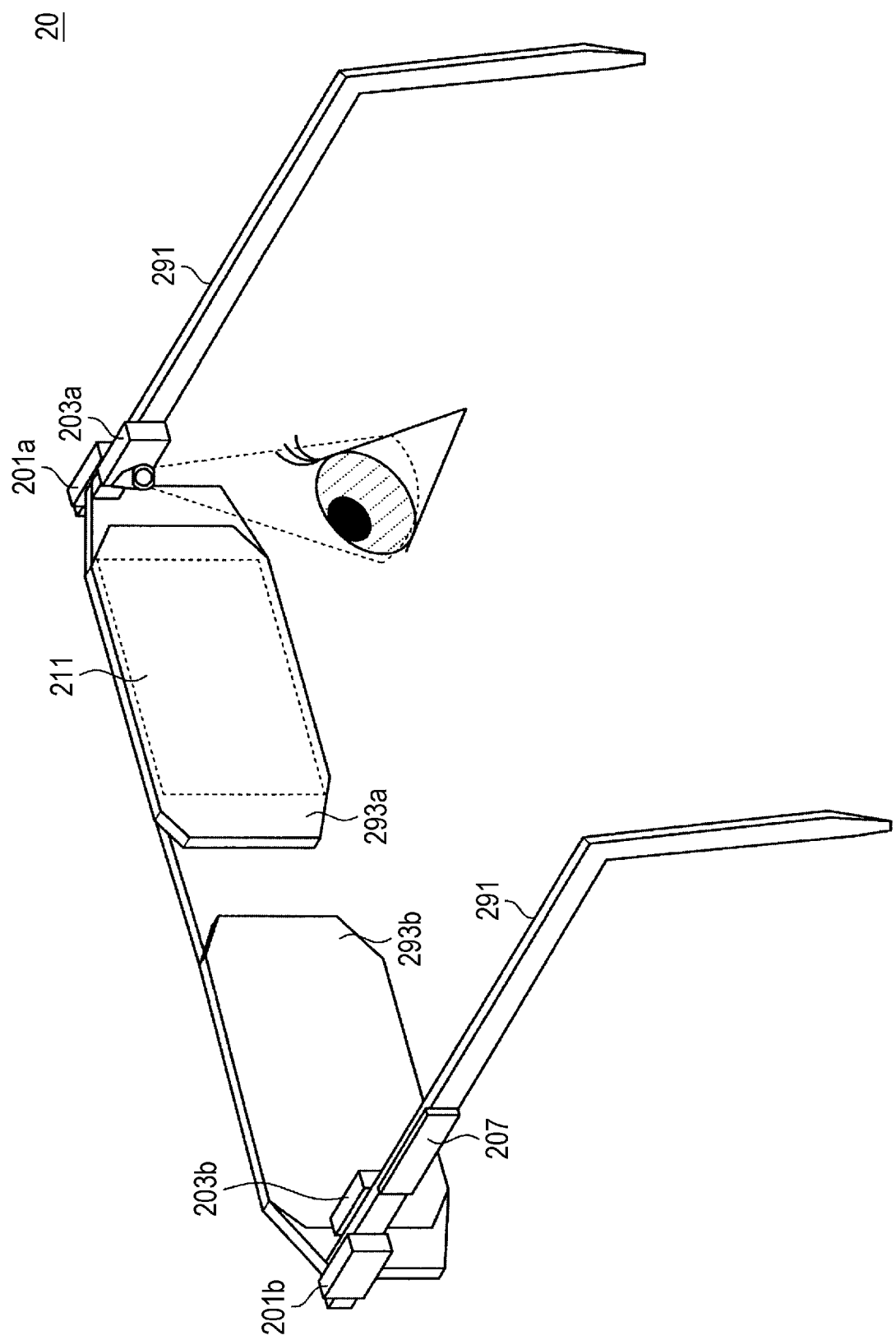
FIG. 2 is an explanatory diagram for describing an example of a schematic configuration of an input/output device according to the same embodiment.

Subsequently, an example of a schematic configuration of the input/output device 20 according to the present embodiment shown in FIG. 1 will be described with reference to FIG. 2. FIG. 2 is an explanatory diagram for describing an example of a schematic configuration of the input/output device according to the present embodiment.

The input/output device 20 according to the present embodiment is a so-called head-mounted device that the user uses by wearing on at least a part of the head. For example, in the example shown in FIG. 2, the input/output device 20 is a so-called eyewear type (eyeglass type) device, and at least one of lenses 293a and 293b is a transmissive display (output unit 211). Additionally, the input/output device 20 includes first imaging units 201a and 201b, second imaging units 203a and 203b, an operation unit 207, and a holding unit 291 corresponding to an eyeglass frame. When the input/output device 20 is mounted on the user's head, the holding unit 291 holds the output unit 211, the first imaging units 201a and 201b, the second imaging units 203a and 203b, and the operation unit 207 so that they have a predetermined positional relationship relative to the user's head. Additionally, although not shown in FIG. 2, the input/output device 20 may include a sound collecting unit for collecting the user's voice.

Here, a more specific configuration of the input/output device 20 will be described. For example, in the example shown in FIG. 2, the lens 293a corresponds to the lens on the right eye side, and the lens 293b corresponds to the lens on the left eye side. That is, the holding unit 291 holds the output unit 211 so that the output unit 211 (in other words, lenses 293a and 293b) is located in front of the user's eyes when the input/output device 20 is mounted. In other words, the holding unit 291 supports the output unit 211 so as to be located in front of the user's eyes. That is, the holding unit 291 corresponds to an example of a "support unit".

The first imaging units 201a and 201b are so-called stereo cameras, and are held by the holding unit 291 so that they face the direction in which the user's head faces (i.e., front of user) when the input/output device 20 is mounted on the user's head. At this time, the first imaging unit 201a is held in the vicinity of the user's right eye, and the first imaging unit 201b is held in the vicinity of the user's left eye. Based on such a configuration, the first imaging units 201a and 201b image a subject (in other words, real object located in real space) located in front of the input/output device 20 from different positions. As a result, the input/output device 20 acquires images of the subject located in front of the user, and can calculate the distance from the input/output device 20 to the subject on the basis of the parallax between the images captured by the first imaging units 201a and 201b. Note that in a case where the term "image" is used in the present disclosure, "still image" and "moving image" may be included unless otherwise specified.

Note that as long as the distance between the input/output device 20 and the subject can be measured, the configuration and method thereof are not particularly limited. As a specific example, the distance between the input/output device 20 and the subject may be measured on the basis of a scheme such as multi-camera stereo, motion parallax, time of flight (TOF), or Structured Light. Here, TOF is a scheme of projecting light such as infrared rays onto a subject and measuring the time until the projected light is reflected by the subject and returned for each pixel to obtain an image (so-called distance image) including the distance (depth) to the subject on the basis of the measurement result. Additionally, Structured Light is a scheme of irradiating a subject with a pattern by light such as infrared rays, and imaging the pattern to obtain the distance (depth) to the subject on the basis of the change in the pattern obtained from the imaging result. Additionally, motion parallax is a scheme of measuring the distance to the subject on the basis of the parallax even with a so-called monocular camera. Specifically, the subject is imaged from different viewpoints by moving the camera, and the distance to the subject is measured on the basis of the parallax between the captured images. Note that at this time, by recognizing the moving distance and the moving direction of the camera by various sensors, it is possible to measure the distance to the subject with higher accuracy. Note that the configuration of the imaging unit (e.g., monocular camera, stereo camera, or the like) may be changed according to the distance measurement method.

Additionally, the second imaging units 203a and 203b are held by the holding unit 291 so that the user's eyeballs are located within the imaging ranges of the second imaging units 203a and 203b when the input/output device 20 is mounted on the user's head. As a specific example, the second imaging unit 203a is held so that the user's right eye is located within the imaging range of the second imaging unit 203a. On the basis of such a configuration, it is possible to recognize the direction of the line-of-sight of the right eye on the basis of an image of the eyeball of the right eye captured by the second imaging unit 203a and the positional relationship between the second imaging unit 203a and the right eye. Similarly, the second imaging unit 203b is held so that the user's left eye is located within the imaging range of the second imaging unit 203b. That is, it is possible to recognize the direction of the line-of-sight of the left eye on the basis of an image of the eyeball of the left eye captured by the second imaging unit 203b and the positional relationship between the second imaging unit 203b and the left eye. Note that while the configuration in which the input/output device 20 includes both the second imaging units 203a and 203b is shown in the example of FIG. 2, it is also possible to provide only one of the second imaging units 203a and 203b.

The operation unit 207 is a configuration for accepting a user's operation on the input/output device 20. The operation unit 207 may be an input device such as a touch panel or a button, for example. The operation unit 207 is held at a predetermined position of the input/output device 20 by the holding unit 291. For example, in the example shown in FIG. 2, the operation unit 207 is held at a position corresponding to the temple of the eyeglasses.

Additionally, the input/output device 20 according to the present embodiment may be provided with an acceleration sensor or an angular velocity sensor (gyro sensor), for example, and be capable of detecting the movement of the user's head wearing the input/output device 20 (in other words, movement of input/output device 20 itself). As a specific example, the input/output device 20 may detect each of components of the yaw direction, the pitch direction, and the roll direction as the movement of the user's head to recognize changes in at least one of the position or posture of the user's head.

On the basis of the above configuration, the input/output device 20 according to the present embodiment can recognize changes in the position and posture of the input/output device 20 in real space according to the movement of the user's head. Additionally, at this time, on the basis of so-called AR technology, the input/output device 20 can present virtual contents (i.e., virtual objects) on the output unit 211 so that the virtual contents are superimposed on real objects located in real space. Note that an example of a method for the input/output device 20 to estimate its own position and posture (i.e., self-localization) in real space will be described in detail later.

Note that examples of a head-mounted display (HMD) applicable as the input/output device 20 include a see-through type HMD, a video see-through type HMD, and a retinal projection type HMD.

The see-through type HMD uses a half mirror or a transparent light guide plate to hold a virtual image optical system (i.e., display unit having optical transparency) including a transparent light guide unit or the like in front of the user, and displays an image inside the virtual image optical system, for example. For this reason, the user wearing the see-through type HMD can also see the outside scenery while viewing the image displayed inside the virtual image optical system. With such a configuration, the see-through HMD can superimpose an image of a virtual object on an optical image of a real object located in real space, according to the recognition result of at least one of the position or the posture of the see-through HMD on the basis of AR technology, for example. Note that as a specific example of the see-through type HMD, there is a so-called eyeglass-type wearable device in which a part corresponding to a lens of the eyeglasses is a virtual image optical system. For example, the input/output device 20 shown in FIG. 2 corresponds to an example of a see-through type HMD.

When a video see-through type HMD is mounted on the user's head or face, it is mounted so as to cover the user's eyes, and a display unit such as a display is held in front of the user's eyes. Additionally, the video see-through type HMD has an imaging unit for imaging the surrounding scenery, and displays an image of the scenery in front of the user captured by the imaging unit on the display unit. With such a configuration, although it is difficult for the user wearing the video see-through type HMD to directly see the outside scenery, it is possible to confirm the outside scenery by the image displayed on the display unit. Additionally, at this time, the video see-through type HMD may superimpose a virtual object on the image of the outside scenery, according to the recognition result of at least one of the position or the posture of the video see-through type HMD on the basis of AR technology, for example.

In the retinal projection type HMD, a projection unit is held in front of the user's eyes, and an image is projected from the projection unit toward the user's eyes so that the image is superimposed on the outside scenery. More specifically, in the retinal projection type HMD, an image is directly projected from the projection unit onto the retina of the user's eye, and the image is formed on the retina. With such a configuration, even a user with myopia or hyperopia can view a clearer image. Additionally, the user wearing the retinal projection type HMD can see the outside scenery while viewing the image projected from the projection unit. With such a configuration, the retinal projection type HMD can superimpose an image of a virtual object on an optical image of a real object located in real space, according to the recognition result of at least one of the position and posture of the retinal projection type HMD on the basis of AR technology, for example.

In addition to the examples described above, there is an HMD called an immersive HMD. Similarly to the video see-through HMD, the immersive HMD is mounted so as to cover the user's eyes, and a display unit such as a display is held in front of the user's eyes. For this reason, it is difficult for the user wearing the immersive HMD to directly see the outside scenery (i.e., real world scenery), and the user can only see the image displayed on the display unit. With such a configuration, the immersive HMD can give an immersive feeling to the user who is viewing the image. For this reason, the immersive HMD can be applied to a case of presenting information mainly on the basis of virtual reality (VR) technology, for example.

Hereinabove, an example of a schematic configuration of the input/output device according to the embodiment of the present disclosure has been described with reference to FIG. 2.

1.3. Principle of Self-Localization

Next, an example of the principle of a method (i.e., self-localization) used by the input/output device 20 for estimating its own position and posture in real space when superimposing a virtual object on a real object will be described.

As a specific example of self-localization, the input/output device 20 captures a marker or the like whose size is known presented on a real object in real space by an imaging unit such as a camera provided in the input/output device 20. Then, the input/output device 20 analyzes the captured image to estimate at least one of an own position or posture relative to the marker (and therefore real object on which marker is presented). Note that while the following description will be given by focusing on a case where the input/output device 20 estimates its own position and posture, the input/output device 20 may estimate only one of the own position and posture.

Specifically, it is possible to estimate the direction of the imaging unit (and therefore input/output device 20 including imaging unit) relative to the marker according to the orientation of the marker captured in the image (e.g., orientation of marker pattern or the like). Additionally, if the size of the marker is known, it is possible to estimate the distance between the marker and the imaging unit (i.e., input/output device 20 including imaging unit) according to the size of the marker in the image. More specifically, if the marker is imaged from a farther distance, the marker is imaged smaller. Additionally, the range in real space captured in the image at this time can be estimated on the basis of the angle of view of the imaging unit. By utilizing the above characteristics, the distance between the marker and the imaging unit can be calculated backward according to the size of the marker captured in the image (in other words, ratio of marker in the angle of view). With the configuration as described above, the input/output device 20 can estimate its own position and posture relative to the marker.

Additionally, so-called simultaneous localization and mapping (SLAM) technology may be used for self-localization of the input/output device 20. SLAM is a technology for performing self-localization and environment map creation in parallel by using an imaging unit such as a camera, various sensors, an encoder, and other components. As a more specific example, in SLAM (particularly, visual SLAM), three-dimensional shapes of captured scenes (or subjects) are sequentially restored on the basis of a moving image captured by the imaging unit. Then, by associating the restored result of the captured scene with the detection result of the position and posture of the imaging unit, a map of the surrounding environment can be created, and the position and posture of the imaging unit (and therefore input/output device 20) in the environment can be estimated. Note that by providing various sensors such as an acceleration sensor and an angular velocity sensor in the input/output device 20, for example, the position and posture of the imaging unit can be estimated as information indicating relative changes on the basis of the detection results of the sensors. Of course, as long as the position and posture of the imaging unit can be estimated, the method is not necessarily limited to the method based on the detection results of various sensors such as an acceleration sensor and an angular velocity sensor.

Under the configuration described above, the estimation result of the position and posture of the input/output device 20 relative to a known marker based on the imaging result of the marker by the imaging unit may be used for initialization processing and position correction in SLAM described above, for example. With such a configuration, even in a situation where the marker is not included in the angle of view of the imaging unit, the input/output device 20 can perform self-localization based on SLAM according to the result of previously performed initialization and position correction, and estimate the own position and posture relative to the marker (and therefore real object on which marker is presented).

Additionally, while the description above has been given mainly focusing on the case where self-localization is performed on the basis of the imaging result of the marker, the detection result of targets other than a marker may be used for self-localization, as long as it can be used as a reference for self-localization. As a specific example, instead of the above marker, the detection result of a characteristic part of a body in real space (real object) such as the shape and pattern of the body may be used for initialization processing and position correction in SLAM.

Hereinabove, an example of the principle of the method (i.e., self-localization) used by the input/output device 20 for estimating its own position and posture in real space when superimposing a virtual object on a real object has been described. Note that in the following description, it is assumed that the position and posture of the input/output device 20 relative to a body in real space (real object) can be estimated on the basis of the above-mentioned principle, for example.

2. CONSIDERATION OF DISPLAY CORRECTION ACCORDING TO DELAY BETWEEN MOVEMENT OF VIEWPOINT AND PRESENTATION OF INFORMATION

Subsequently, an outline of correction of display information according to a delay between movement of the viewpoint (e.g., user's head) and presentation of information in a case of presenting information to the user according to changes in the position and posture of the viewpoint such as AR or VR will be described, and then a technical problem of the information processing system according to the present embodiment will be described.

In the case of presenting information to the user according to changes in the position and posture of the viewpoint, a delay between detection of the movement of the viewpoint and presentation of the information (so-called motion-to-photon latency) may affect the user's experience. As a specific example, in a case of presenting a virtual body as if it exists in front of the user according to the orientation of the user's head, it may take time to perform a series of processing of recognizing the orientation of the user's head from the detection result of the movement of the head and presenting information according to the recognition result. In such a case, a deviation according to the above processing delay may occur between the movement of the user's head and changes of the field of view according to the movement of the head (i.e., change of information presented to user), for example.

In particular, in a situation such as AR where a virtual body is superimposed on the real world, the delay becomes apparent as a deviation between the real world and the virtual body. For this reason, even if the deviation that becomes apparent as a result of the delay is a slight amount hardly perceived by the user in the case of VR, it may be easily perceived by the user in the case of AR.

As an example of a method of reducing the influence of the delay described above, there is a method of reducing the delay by increasing the processing speed (FPS: frame per second). However, in this case, a processor such as a CPU or GPU with higher performance is required in proportion to the increase in processing speed. Additionally, power consumption may increase or heat may be generated along with the increase in processing speed. In particular, like the input/output device 20 described with reference to FIG. 2, a device for implementing AR or VR may be operated by power supply from a battery, and the increase in power consumption can have a more significant effect. Additionally, with a device such as the input/output device 20 that the user wears on a part of the body for use, due to the way of use, the influence of heat generation (e.g., influence on user wearing device) tends to become more apparent than other devices. Additionally, with a device such as the input/output device 20, the space for installing a device such as a processor is limited as compared with a stationary device, and it may be difficult to apply a high-performance processor.

Figure 3:
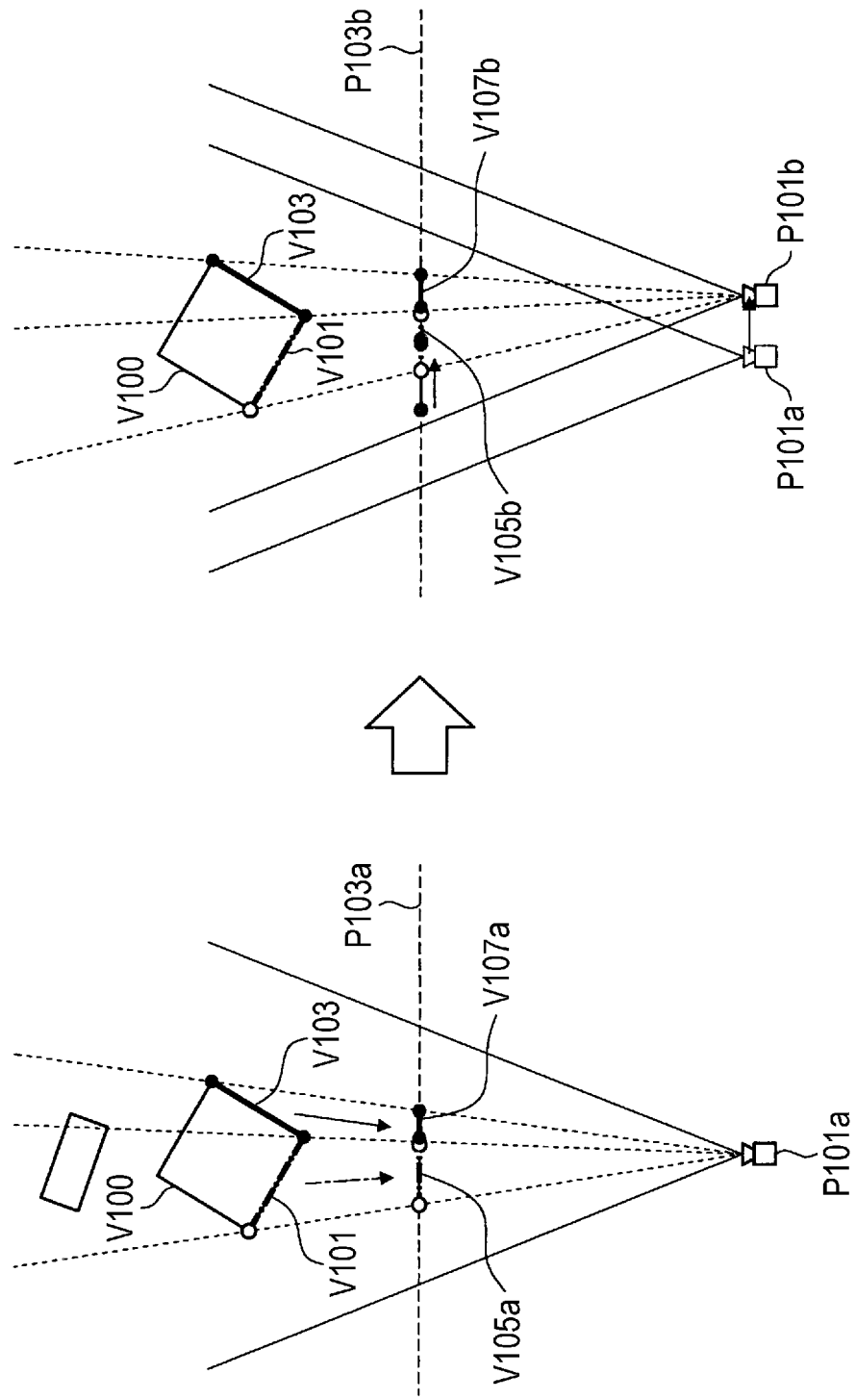
FIG. 3 is an explanatory diagram for describing an outline of an example of processing related to correction of display information according to the position and posture of a viewpoint.

Additionally, as another example of the method of reducing the influence of the delay as described above, there is a method in which, when presenting information to the user, the presentation position of the information is two-dimensionally corrected within the display area according to the position and posture of the viewpoint at the presentation timing. As an example of the technology for two-dimensionally correcting the information presentation position as described above, there are technologies called "time warp" and "reprojection". For example, FIG. 3 is an explanatory diagram for describing an outline of an example of processing related to correction of display information according to the position and posture of the viewpoint, and shows an example of technologies related to correction of display information called "time warp" and "reprojection". Note that while the technology called "reprojection" will be focused on in the following description for convenience, substantially similar contents can be applied to the technology called "time warp".

In FIG. 3, reference sign V100 schematically shows a virtual object (hereinafter also simply referred to as "object") to be presented as display information. For example, various pieces of information are set for the object V100, so that the object V100 is fixed at a desired position in a desired posture in real space. Additionally, reference signs P101a and P101b schematically show a viewpoint (e.g., user's head). Specifically, the viewpoint P101a schematically shows the viewpoint before movement. Additionally, the viewpoint P101b schematically shows the viewpoint after movement. Note that in the following description, when there is no particular distinction between the viewpoints P101a and P101b, they may be simply referred to as "viewpoint P101". Additionally, while the relationship between the viewpoint P101 and the virtual object V100 is presented two-dimensionally for the sake of better understanding in the example shown in FIG. 3, the content of the processing related to reprojection is not necessarily limited. That is, even in a case where the relationship between the viewpoint P101 and the virtual object V100 changes three-dimensionally, by applying processing related to reprojection three-dimensionally (i.e., to consider three-dimensional position and posture relationship), substantially similar processing is performed. This also applies to examples shown in drawings other than FIG. 3 referred to in descriptions below.

In a case of presenting the object V100 having a three-dimensional shape as two-dimensional display information, first, as shown in the left drawing of FIG. 3, using the viewpoint P101a (observation point) as a reference, the object V100 is projected onto a screen surface P103a defined according to the field of view (angle of view) from the viewpoint P101a. That is, the screen surface P103a corresponds to a projection surface defined in association with the viewpoint P101a. At this time, the color of the object when drawing the object V100 as two-dimensional display information may be calculated according to the positional relationship between a light source and the object V100 defined in three-dimensional space. As a result, the two-dimensional shape of the object V100, the color of the object V100, the two-dimensional position where the object V100 is presented (i.e., position on screen surface P103a), and the like are calculated according to the relative positional relationship among the viewpoint P101a (observation point), the object V100, and the screen surface P103a based on the position and posture of the viewpoint P101a.

As a specific example, in the example shown in the left drawing of FIG. 3, of the surfaces of the object V100, it is possible to visually recognize surfaces V101 and V103 located on the viewpoint P103a side from the viewpoint P101a. For this reason, each of the surfaces V101 and V103 is projected onto the screen surface P103a according to the relative position and posture relationship with the viewpoint P101a, and the result of the projection is drawn. For example, reference sign V105a schematically shows two-dimensional display information according to the result of projection of the surface V101 of the object V100 onto the screen surface P103a. Additionally, reference sign V107a schematically shows two-dimensional display information according to the result of projection of the surface V103 of the object V100 onto the screen surface P103a.

Then, the display information V105a and V107a according to the result of the projection described above are drawn in a desired drawing area. As a specific example, the drawing area is associated with at least a partial area of a screen surface P103 (e.g., screen surface P103a described above) defined according to the position and posture of the viewpoint P101, for example, and the result of projection of the object V100 onto the area is drawn as display information (e.g., display information V105a and V107a described above). Additionally, the drawing area described above is associated with a display area of an output unit such as a display, and the drawing result of the display information in the drawing area can be presented in the display area. The drawing area may be defined as at least a part of a predetermined buffer (e.g., frame buffer or the like) that temporarily or permanently holds data such as a drawing result.

On the other hand, the above-mentioned processing related to projection and drawing tends to have a high load, and the posture and position of the viewpoint P101 may have changed at the timing when the display information corresponding to the result of the projection and drawing is presented in the display area of the output unit. In such a case, as described above, the processing (i.e., reprojection) of correcting the display information according to the posture and position of the viewpoint P101 at the timing of presenting the display information in the display area may be applied, for example.

For example, the right drawing of FIG. 3 shows an example of a case where, when the display information V105a and V107a described above are presented in the display area of the output unit, the display information V105a and V107a are corrected according to the position and posture of the viewpoint P101b at the timing of the presentation. In the right drawing of FIG. 3, reference sign P103b schematically shows a screen surface defined in association with the viewpoint P101b after movement.

Specifically, in the example shown in the right drawing of FIG. 3, the presentation positions of the display information V105a and V107a on the screen surface P103 (in other words, display area of output unit) are corrected according to the change (difference) in the position and posture between the viewpoint P101a before movement and the viewpoint P101b after movement. Additionally, at this time, the shapes of the display information V105a and V107a may be corrected (i.e., may be deformed) according to the difference in position and posture between the viewpoint P101a and the viewpoint P101b. For example, reference signs V105b and V107b in the right drawing of FIG. 3 schematically show display information according to the application result of the above correction to the display information V105a and V107a.

With the control described above, it is possible to correct deviation of the superimposed position of an object due to the processing delay related to projection of the object and drawing of the projection result.

On the other hand, the processing related to reprojection described with reference to FIG. 3 corrects display information two-dimensionally, and it may be difficult to perform sufficient correction in a case where the position or posture of the viewpoint changes three-dimensionally.

Figure 4:
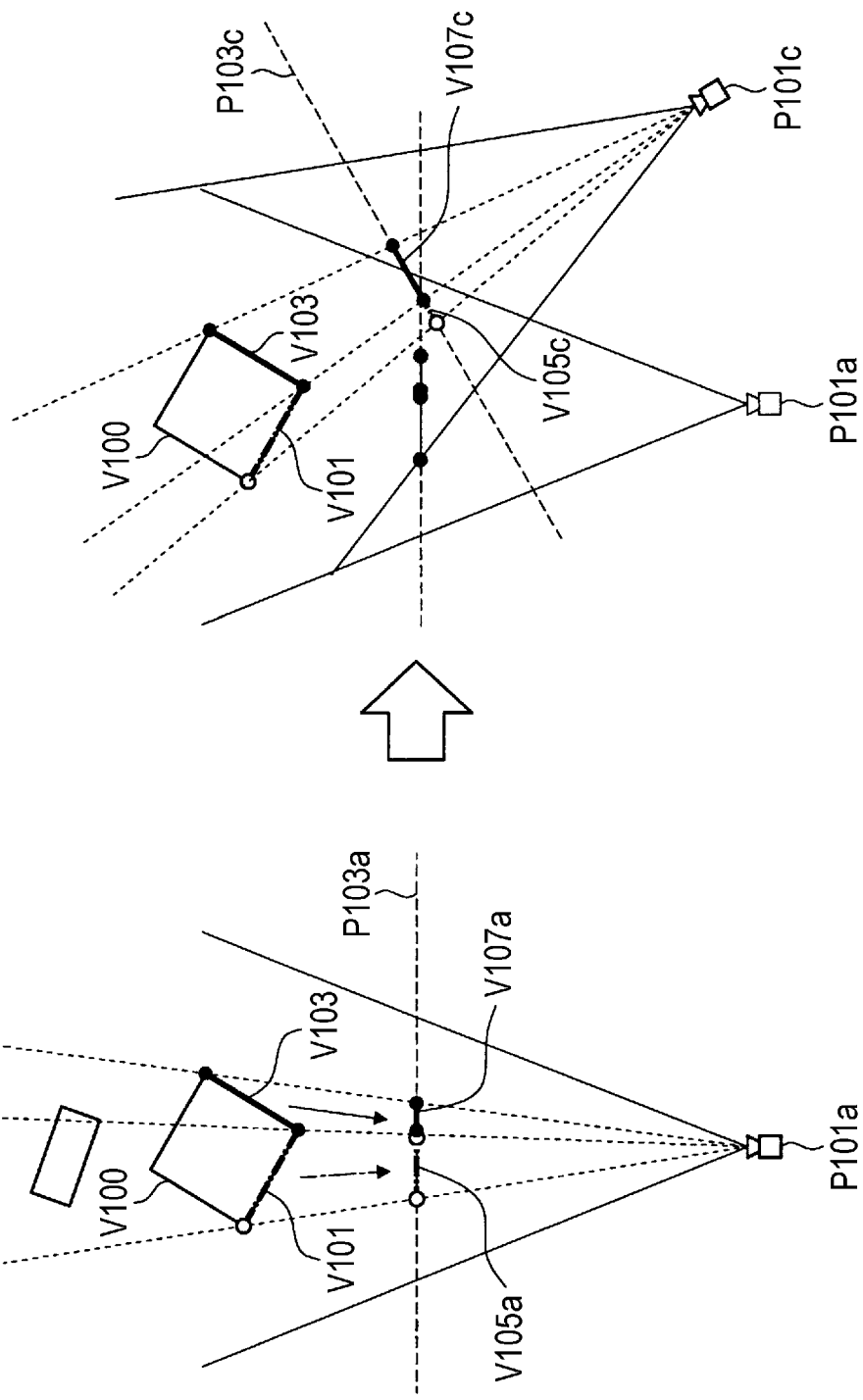
FIG. 4 is an explanatory diagram for describing an outline of another example of processing related to correction of display information according to the position and posture of a viewpoint.

For example, FIG. 4 is an explanatory diagram for describing an outline of another example of processing related to correction of display information according to the position and posture of a viewpoint. Note that in FIG. 4, the same reference signs as those in FIG. 3 show the same objects as those in the example shown in FIG. 3. Additionally, since the left drawing of FIG. 4 is the same as the left drawing of FIG. 3, detailed description thereof will be omitted.

The right drawing of FIG. 4 shows another example of a case where, when the display information V105a and V107a are presented in the display area of the output unit, the display information V105a and V107a are corrected according to the position and posture of the viewpoint P101 at the timing of the presentation. In the right drawing of FIG. 4, reference sign P101c schematically shows the viewpoint P101 after movement. Additionally, reference sign P103c schematically shows a screen surface (projection surface) defined according to the field of view (angle of view) from the viewpoint P101c.

The example shown on the right drawing of FIG. 4 is different from the example shown in the right drawing of FIG. 3 in that the position and posture of the viewpoint P101 change along with rotation of the viewpoint P101. Specifically, in the example shown in the right drawing of FIG. 4, the position and posture of the viewpoint P101 change in such a manner that the viewpoint P101 moves laterally while rotating in the yaw direction.

In such a situation as that shown in the right drawing of FIG. 4, the appearance of the object V100 differs greatly between the viewpoint P101a before movement and the viewpoint P101c after movement. For this reason, it may be difficult to accurately reproduce the shape of the object V100 as viewed from the viewpoint P101c after movement only by correcting the presentation positions of the display information V105a and V107a two-dimensionally as shown in FIG. 3. For this reason, in the example shown in the right drawing of FIG. 4, the shapes of the display information V105a and V107a are corrected according to the rotation direction and the amount of rotation of the viewpoint P101, for example. For example, reference signs V105c and V107c in the right drawing of FIG. 4 schematically show display information according to the application result of the above correction to the display information V105a and V107a.

Specifically, in a case where the viewpoint P101 rotates in the yaw direction or the pitch direction, it may be possible to reproduce display information (e.g., display information V105c and V107c) corresponding to the viewpoint P101c after movement by deforming the display information such that it shifts two-dimensionally. On the other hand, in a case where the viewpoint P101 rotates in the roll direction, reproduction may be difficult only by two-dimensional deformation. In such a case, reproduction may be performed by applying distortion correction or the like, for example, Additionally, with the processing related to reprojection described with reference to FIG. 3, in a situation where the target object has a long shape in the depth direction, it may be difficult to accurately reproduce the object as viewed from a viewpoint after movement.

For example, FIG. 5 is an explanatory diagram for describing an outline of another example of processing related to correction of display information according to the position and posture of a viewpoint. In FIG. 5, reference signs P105a and P105b schematically show a viewpoint (e.g., user's head). Specifically, the viewpoint P105a schematically shows the viewpoint before movement. Additionally, the viewpoint P105b schematically shows the viewpoint after movement. Note that in the following description, when there is no particular distinction between the viewpoints P105a and P105b, they may be simply referred to as "viewpoint P105". Additionally, in FIG. 5, reference sign V110 schematically shows an object to be presented as display information.

The left drawing of FIG. 5 schematically shows processing related to projection and drawing of the object V110 according to the position and posture of the viewpoint P105a. In the left drawing of FIG. 5, reference sign P107a schematically shows a screen surface (projection surface) defined according to the field of view (angle of view) from the viewpoint P105a. In the example shown in the left drawing of FIG. 5, of the surfaces of the object V110, it is possible to visually recognize surfaces V111 and V113 located on the viewpoint P105a side from the viewpoint P105a. For this reason, each of the surfaces V111 and V113 is projected onto the screen surface P107a according to the relative position and posture relationship with the viewpoint P105a, and the result of the projection is drawn. For example, reference sign V115a schematically shows two-dimensional display information according to the result of projection of the surface V111 of the object V110 onto the screen surface P107a. Additionally, reference sign V117a schematically shows two-dimensional display information according to the result of projection of the surface V113 of the object V110 onto the screen surface P107a.

Additionally, the right drawing of FIG. 5 shows an example of a case where, when the display information V115a and V117a described above are presented in the display area of the output unit, the display information V115a and V117a are corrected according to the position and posture of the viewpoint P105b at the timing of the presentation. In the right drawing of FIG. 5, reference sign P107b schematically shows a screen surface defined in association with the viewpoint P105b after movement.

As shown in the right drawing of FIG. 5, among parts of the object V110, the near side and far side in the depth direction appear to change differently when the position of the viewpoint P105 changes. Specifically, when the surface V113 of the object V110 is viewed from the viewpoint P105b after movement, the width appears wider than when viewed from the viewpoint P105a before movement. For this reason, a contradiction may occur in the appearance of the surface V113 of the object V110 by only correcting the presentation positions of the display information V115a and V117a on the screen surface P107 (in other words, display area of output unit) two-dimensionally, for example. For example, in the right drawing of FIG. 5, reference signs V115b and V117b schematically show an example of display information according to the application result of correction (reprojection) to the display information V115a and V117a. That is, in the example shown in the right drawing of FIG. 5, the corrected display information V117b is not presented on a part of the screen surface P107b where the far side of the surface V113 of the object V110 in the depth direction should be visible, resulting in a contradictory appearance.

Additionally, in a situation where there are multiple objects at different distances from the viewpoint, the processing related to reprojection described with reference to FIG. 3 is corrected so that consistency is ensured for any one of the objects. For this reason, in the processing related to reprojection, it may be difficult to accurately reproduce other objects by correction.

Figure 6:
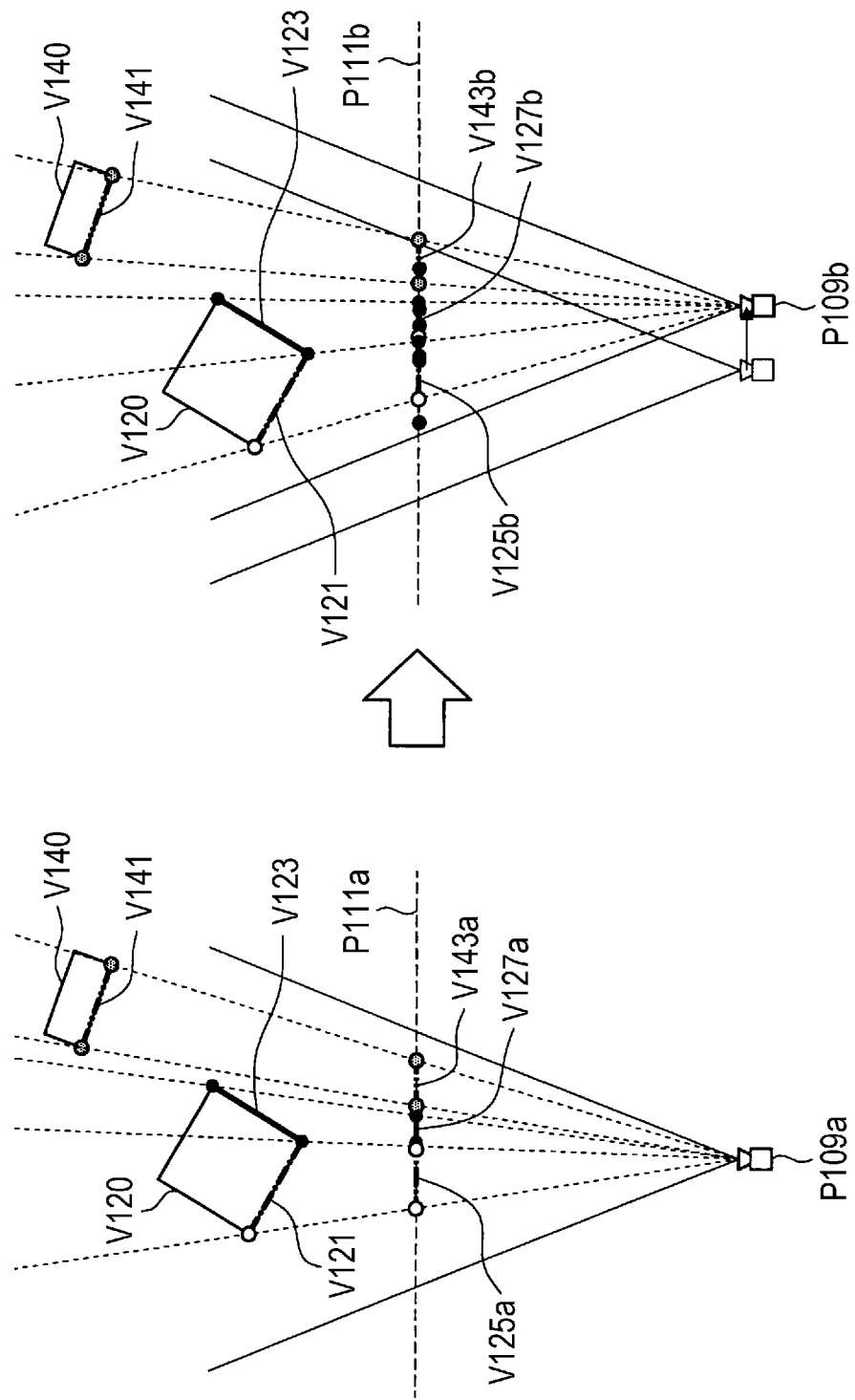
FIG. 6 is an explanatory diagram for describing an outline of another example of processing related to correction of display information according to the position and posture of a viewpoint.

For example, FIG. 6 is an explanatory diagram for describing an outline of another example of processing related to correction of display information according to the position and posture of a viewpoint. In FIG. 6, reference signs P109a and P109b schematically show a viewpoint (e.g., user's head). Specifically, the viewpoint P109a schematically shows the viewpoint before movement. Additionally, the viewpoint P109b schematically shows the viewpoint after movement. Note that in the following description, when there is no particular distinction between the viewpoints P109a and P109b, they may be simply referred to as "viewpoint P109". Additionally, in FIG. 6, reference signs V120 and V140 schematically show objects to be presented as display information.

The left drawing of FIG. 6 schematically shows processing related to projection and drawing of the objects V120 and V140 according to the position and posture of the viewpoint P195a. In the left drawing of FIG. 6, reference sign P111a schematically shows a screen surface (projection surface) defined according to the field of view (angle of view) from the viewpoint P109a. In the example shown in the left drawing of FIG. 6, of the surfaces of the object V120, it is possible to visually recognize surfaces V121 and V123 located on the viewpoint P109a side from the viewpoint P109a, and of the surfaces of the object V140, it is possible to visually recognize a surface V141 located on the viewpoint P109a side from the viewpoint P109a. For this reason, each of the surfaces V121, V123, and V141 is projected onto the screen surface P111a according to the relative position and posture relationship with the viewpoint P109a, and the result of the projection is drawn. For example, reference sign V125a schematically shows two-dimensional display information according to the result of projection of the surface V121 of the object V120 onto the screen surface P111a. Additionally, reference sign V127a schematically shows two-dimensional display information according to the result of projection of the surface V123 of the object V120 onto the screen surface P111a. Additionally, reference sign V143a schematically shows two-dimensional display information according to the result of projection of the surface V141 of the object V140 onto the screen surface P111a.

Additionally, the right drawing of FIG. 6 shows an example of a case where, when the display information V125a, V127a, and V143a described above are presented in the display area of the output unit, the display information V125a, V127a, and V143a are corrected according to the position and posture of the viewpoint P109b at the timing of the presentation. In the right drawing of FIG. 6, reference sign P111b schematically shows a screen surface defined in association with the viewpoint P109b after movement.

Specifically, in the example shown in the right drawing of FIG. 6, the pieces of display information (i.e., display information V125a, V127a, and V143a) are corrected so that any one of the multiple objects at different distances from the viewpoint P109 appears more correctly (i.e., consistency is ensured). For example, in the example shown in the right drawing of FIG. 6, the presentation positions of the display information V125a, V127a, and V143a are corrected so that the object V120 located closer to the near side when viewed from the viewpoint P109 appears more correctly. For example, reference signs V125b, V127b, and V143b schematically show an example of display information according to the application result of correction (reprojection) to the display information V125a, V127a, and V143a.

On the other hand, the appearances of the object V120 and the object V140, which are at different distances from the viewpoint P109, change differently when the position of the viewpoint P109 changes. In such a situation, in the example shown in the right drawing of FIG. 6, correction is performed so that the appearance of the display information V125b and V127b respectively corresponding to the surfaces V121 and V123 of the object V120 is more correct. For this reason, the display information V143b corresponding to the surface V141 of the object V140 is presented at a position deviated from the position where it should originally be visible from the viewpoint P109b. That is, in the example shown in FIG. 6, there is some contradiction in the appearance of the object V140 when viewed from the viewpoint P109b after movement.

As described above, by simply correcting display information according to the projection result of an object two-dimensionally, it may be difficult to accurately reflect the three-dimensional position and posture relationship between the viewpoint and the object at the time of correction, according to changes in the position and posture of the viewpoint and the target object, for example. Against this background, the present disclosure proposes a technology that makes it possible to present information according to the position and posture of the viewpoint in a more preferable manner. Specifically, proposed is a technology that makes it possible to more accurately reflect the three-dimensional position and posture relationship between the viewpoint and an object even in a case where correction processing corresponding to so-called reprojection is applied.

3. TECHNICAL FEATURES

Technical features of the information processing system according to the embodiment of the present disclosure will be described below.

3.1. Basic Idea

Figure 7:
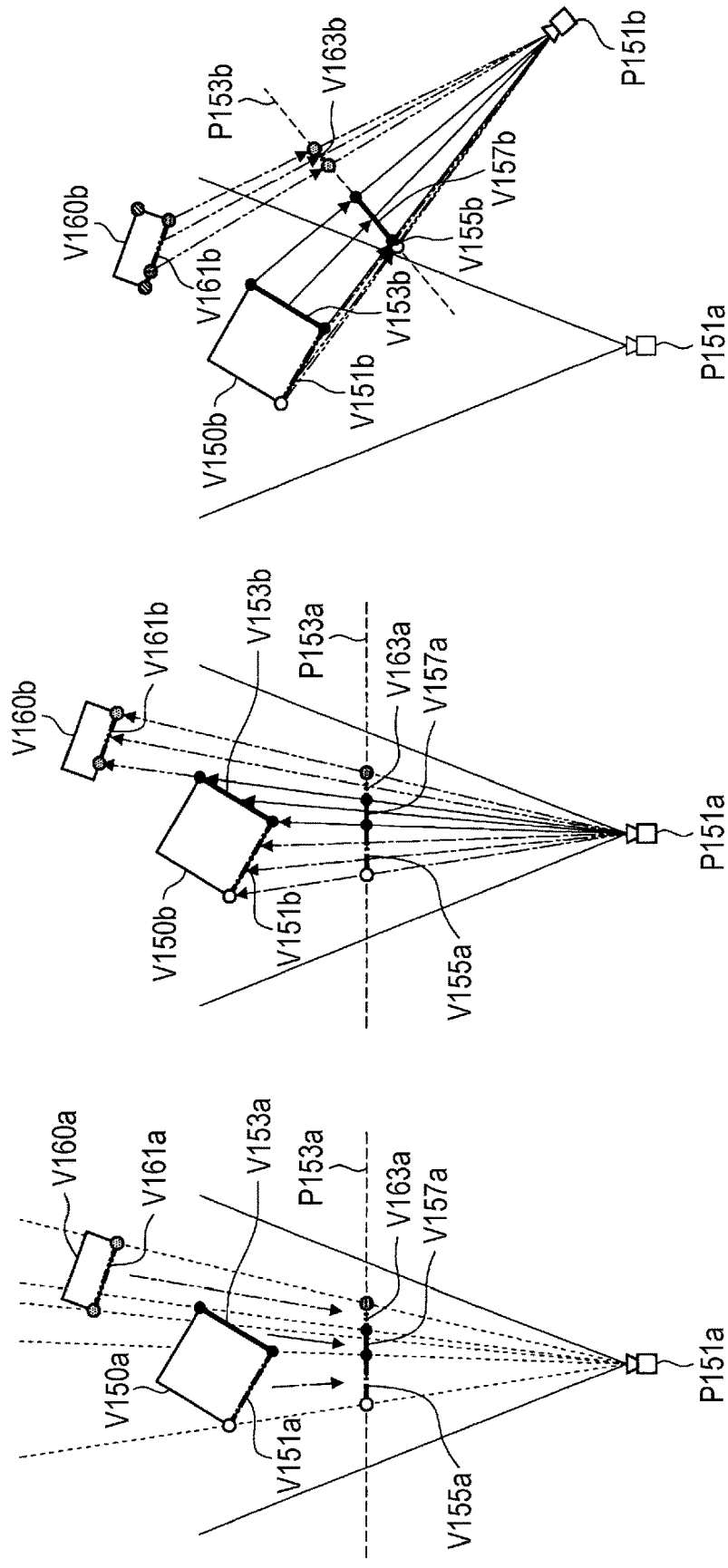
FIG. 7 is an explanatory diagram for describing an outline of the basic idea of the technical features of the information processing system according to the same embodiment.

First, technical features of the information processing system according to the embodiment of the present disclosure will be described by particularly focusing on processing of, when presenting display information according to the projection result of an object, correcting the display information according to the position and posture of the viewpoint at the timing of the presentation. For example, FIG. 7 is an explanatory diagram for describing an outline of the basic idea of the technical features of the information processing system according to the embodiment of the present disclosure. In FIG. 7, reference signs P151$a$ and P151$b$ schematically show a viewpoint (e.g., user's head). Specifically, the viewpoint P151$a$ schematically shows the viewpoint before movement. Additionally, the viewpoint P151$b$ schematically shows the viewpoint after movement. Note that in the following description, when there is no particular distinction between the viewpoints P151$a$ and P151$b$, they may be simply referred to as "viewpoint P151".

First, an outline of processing related to projection and drawing of an object in the information processing system according to the embodiment of the present disclosure will be described with reference to the left drawing of FIG. 7. In the left drawing of FIG. 7, reference signs V150$a$ and V160$a$ schematically show objects to be presented as display information. Additionally, reference sign P153$a$ schematically shows a screen surface (projection surface) defined according to the field of view (angle of view) from the viewpoint P151$a$. In the example shown in the left drawing of FIG. 7, of the surfaces of the object V150$a$, it is possible to visually recognize surfaces V151$a$ and V153$a$ located on the viewpoint P151$a$ side from the viewpoint P151$a$, and of the surfaces of the object V160$a$, it is possible to visually recognize a surface V161$a$ located on the viewpoint P151$a$ side from the viewpoint P151$a$. For this reason, each of the surfaces V151$a$, V153$a$, and V161$a$ is projected onto the screen surface P153$a$ according to the relative position and posture relationship with the viewpoint P151$a$, and the result of the projection is drawn. That is, the viewpoint P151$a$ before movement corresponds to an example of a "first viewpoint", and the screen surface P153$a$ defined in association with the viewpoint P151$a$ (i.e., first viewpoint) corresponds to an example of a "first projection surface". For example, reference sign V125$a$ schematically shows two-dimensional display information according to the result of projection of the surface V121 of the object V120 onto the screen surface P111$a$. Additionally, reference sign V127$a$ schematically shows two-dimensional display information according to the result of projection of the surface V123 of the object V120 onto the screen surface P111$a$. Additionally, reference sign V143$a$ schematically shows two-dimensional display information according to the result of projection of the surface V141 of the object V140 onto the screen surface P111$a$.

Additionally, in the information processing system according to the present embodiment, information according to the relative position and posture relationship between the viewpoint and the object is associated with the projection result of each object. As a specific example, in the example shown in the left drawing of FIG. 7, information regarding the distance between the viewpoint P151$a$ and the surface V151$a$ of the object V150$a$ (e.g., z value of z-buffer method or the like) is associated with the display information V155$a$ according to the projection result of the surface V151$a$. Note that in the following description, the information regarding the distance between the viewpoint and an object associated with the display information described above is also referred to as "distance information" for convenience. Similarly, distance information regarding the distance between the viewpoint P151$a$ and the surface V153$a$ of the object V150$a$ is associated with the display information V157$a$ according to the projection result of the surface V153$a$. Additionally, distance information regarding the distance between the viewpoint P151$a$ and the surface V161$a$ of the object V160$a$ is associated with the display information V163$a$ according to the projection result of the surface V161$a$.

Note that while the following description will focus on an example in which distance information is associated with display information, the information associated with the display information described above is not necessarily limited to distance information, as long as it is information that can be used to identify the relative position and posture relationship between the viewpoint and the object. As a specific example, the coordinates of the viewpoint and the object in a predetermined coordinate system may be associated as information corresponding to the relative position and posture relationship between the viewpoint and the object. Additionally, various information according to the relative position and posture relationship between the viewpoint and the object can be acquired on the basis of information regarding the position and posture of the viewpoint, information regarding the position and posture in which to fix the object, and the like, for example. It goes without saying that the method, too, is not particularly limited as long as it is possible to acquire information that can be used to identify the relative position and posture relationship between the viewpoint and the object. Additionally, the above-mentioned display information according to the projection result of an object corresponds to an example of "first information". Additionally, information associated with the display information (i.e., first information), that is, information according to the relative position and posture relationship between the viewpoint and the object corresponds to an example of "second information".

Next, with reference to the center and right drawings of FIG. 7, an outline of processing related to correction of display information according to the position and posture of the viewpoint (i.e., processing corresponding to reprojection) performed by the information processing system according to the embodiment of the present disclosure will be described.

In the information processing system according to the present embodiment, when correcting display information drawn according to the projection result of an object according to the position and posture of the viewpoint, three-dimensional information of the object is first restored. For example, in the example shown in the center drawing of FIG. 7, three-dimensional information (e.g., information on three-dimensional position, posture, shape, and the like) of the objects V150$a$ and V160$a$ are restored on the basis of each of the display information V155$a$, V157$a$, and V163$a$ and information (e.g., distance information) associated with each piece of display information. Note that in the following description, the restoration results of the objects V150$a$ and V160$a$ may be referred to as "object V150$b$" and "object V160$b$" in order to distinguish them from the objects V150$a$ and V160$a$ as projection targets. On the other hand, when there is no particular distinction between the objects V150a and V150b, they may be simply referred to as "object V150". Similarly, when there is no particular distinction between the objects V160a and V160b, they may be simply referred to as "object V160".

As a specific example, three-dimensional information of a surface V151b of the object V150b is restored on the basis of the display information V155a and the distance information associated with the display information V155a. Similarly, three-dimensional information of a surface V153b of the object V150b is restored on the basis of the display information V157a and the distance information associated with the display information V157a. Additionally, three-dimensional information of the surface V161b of the object V160b is restored on the basis of the display information V163a and the distance information associated with the display information V163a.

Next, as shown in the right drawing of FIG. 7, the restored objects V150b and V160b are reprojected on a screen surface P153b (projection surface) defined according to the field of view (angle of view) from the viewpoint P151b after movement (i.e., viewpoint at presentation timing of display information), on the basis of the position and posture of the viewpoint P151b. That is, the viewpoint P151b after movement, which is the target of the reprojection, corresponds to an example of a "second viewpoint", and the projection surface P153b defined in association with the viewpoint P151b (i.e., second viewpoint) corresponds to an example of a "second projection surface". Note that the position and posture of the viewpoint P151b after movement can be calculated on the basis of detection results of changes in the position and posture of the viewpoint P151 by various sensors such as an acceleration sensor and an angular velocity sensor, and self-localization or the like based on the detection results, for example.

In the right drawing of FIG. 7, reference sign V155b schematically shows display information according to the result of reprojection of the surface V151b of the restored object V150b. Similarly, reference sign V157b schematically shows display information according to the result of reprojection of the surface V153b of the restored object V150b. Additionally, reference sign V163b schematically shows display information according to the result of reprojection of the surface V161b of the restored object V160b.

As described above, in the information processing system according to the present embodiment, the target object is projected and drawn according to the position and posture of the viewpoint, and information according to the relative position and posture relationship between the object and the viewpoint is associated with display information according to the result of the projection and the drawing. That is, in addition to information of each pixel according to the drawing result (e.g., color information and the like of each pixel), distance information (i.e., information regarding distance between corresponding object and viewpoint such as Z value) or the like is associated with the display information. Additionally, when presenting display information according to the result of the projection and the drawing through the output unit, first, three-dimensional information of the object is restored on the basis of the display information and the distance information, and the restored object is reprojected according to the position and posture of the viewpoint at the presentation timing. As a result, the display information according to the drawing result is corrected according to the position and posture of the viewpoint after movement (e.g., presentation position and shape are corrected).

As described above, according to the information processing system according to the present embodiment, even in a situation where correction (processing corresponding to so-called reprojection) according to the position and posture of the viewpoint is applied to display information according to the projection result of an object, it is possible to more accurately reflect the three-dimensional position and posture relationship between the viewpoint and the object. That is, according to the information processing system according to the present embodiment, in a situation where information is presented to the user according to changes in the position and posture of the viewpoint, it is possible to more preferably correct deviation of the superimposed position of display information corresponding to processing delay between detection of movement of the viewpoint and presentation of information.

3.2. Functional Configuration

Figure 8:
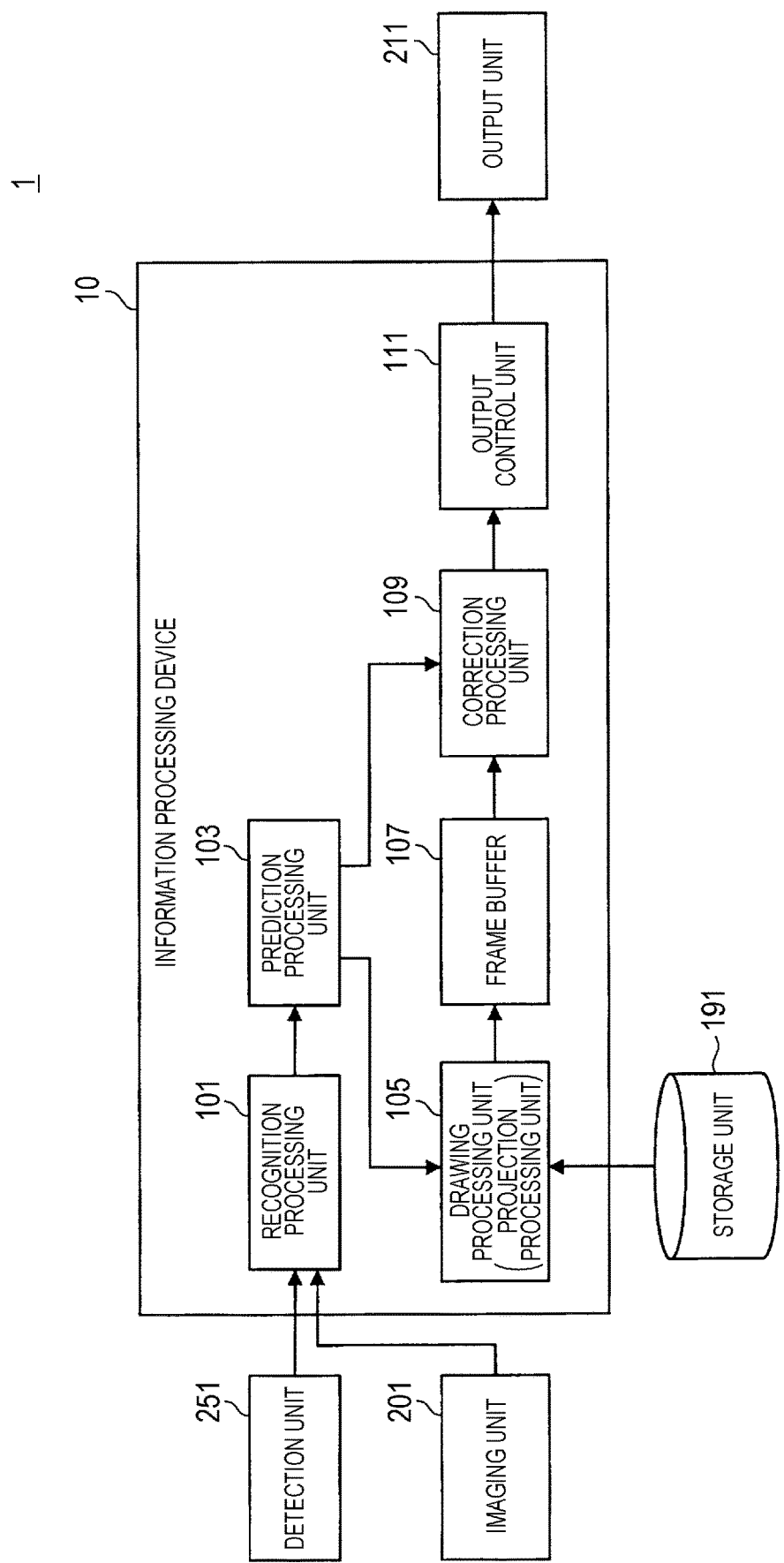
FIG. 8 is a block diagram showing an example of a functional configuration of an information processing system according to the same embodiment.

Subsequently, an example of the functional configuration of the information processing system according to the embodiment of the present disclosure will be described. For example, FIG. 8 is a block diagram showing an example of the functional configuration of the information processing system according to the present embodiment. Specifically, FIG. 8 shows an example of the functional configuration of the information processing system 1 shown in FIG. 1 by focusing, in particular, on a configuration of the information processing device 10 for presenting information to the user through the output unit 211 of the input/output device 20 according to changes in the position and posture of the input/output device 20.

As shown in FIG. 8, the information processing system 1 according to the present embodiment includes the information processing device 10, an imaging unit 201, a detection unit 251, the output unit 211, and a storage unit 191. Note that the output unit 211 corresponds to the output unit 211 described with reference to FIG. 2, for example.

The imaging unit 201 corresponds to the first imaging units 201a and 201b as stereo cameras in FIG. 2. The imaging unit 201 captures an image of a body (subject) in real space, and outputs the captured image to the information processing device 10.

The detection unit 251 schematically shows a part related to acquisition of information for detecting a change in the position or posture of the input/output device 20 (and therefore movement of head of user wearing input/output device 20). That is, the detection unit 251 acquires information for detecting a change in the position or posture of the viewpoint (in other words, change in position or posture of input/output device 20). As a specific example, the detection unit 251 may include various sensors related to detection of movement of a body such as an acceleration sensor and an angular velocity sensor. The detection unit 251 outputs the acquired information to the information processing device 10. As a result, the information processing device 10 can recognize changes in the position and posture of the input/output device 20.

The storage unit 191 temporarily or permanently stores programs and data for the information processing device 10 to implement various functions. As a specific example, the storage unit 191 may hold data of virtual contents to be presented through the output unit 211 (e.g., data for reproducing shape, color, arrangement, and the like of virtual object). Note that if the information processing device 10 can access the storage unit 191, the position where the storage unit 191 is provided is not particularly limited. As a specific example, the storage unit 191 may be built in the information processing device 10. Additionally, as another example, the storage unit 191 may be a device other than the information processing device 10, and may be externally attached to the information processing device 10. Additionally, as another example, the storage unit 191 may be a device other than the information processing device 10, and may be connected to the information processing device 10 through a network.

Next, a configuration of the information processing device 10 will be described. As shown in FIG. 8, the information processing device 10 includes a recognition processing unit 101, a prediction processing unit 103, a drawing processing unit 105, a frame buffer 107, a correction processing unit 109, and an output control unit 111.

The recognition processing unit 101 acquires a captured image from the imaging unit 201, and performs analysis processing on the acquired image to recognize a body (subject) in real space captured in the image. As a specific example, the recognition processing unit 101 acquires images captured from multiple different viewpoints (hereinafter also referred to as "stereo image") from the imaging unit 201 as a stereo camera, and measures the distance to the body captured in the image on the basis of the parallax between the acquired images, for each pixel of the image. As a result, the recognition processing unit 101 can estimate or recognize the relative positional relationship (particularly, positional relationship in depth direction) in real space between the imaging unit 201 (and therefore input/output device 20) and each body captured in the image at the timing when the image was captured. It goes without saying that the above is merely an example, and the method and configuration are not particularly limited as long as a body in real space can be recognized. That is, the configuration of the imaging unit 201 and other components may be changed as appropriate according to the method of recognizing a body in real space.

Additionally, the recognition processing unit 101 may recognize the position and posture of the viewpoint on the basis of the technology of self-localization, for example. As a specific example, the recognition processing unit 101 may perform self-localization and creation of an environment map on the basis of SLAM to recognize the positional relationship in real space between the input/output device 20 (in other words, viewpoint) and a body captured in the image. In this case, for example, the recognition processing unit 101 may acquire information regarding the detection result of changes in the position and posture of the input/output device 20 from the detection unit 251, and use the information for self-localization based on SLAM.

As a more specific example, the recognition processing unit 101 calculates the current position, posture, speed, inertial acceleration, and the like of the input/output device 20 by using self-localization based on SLAM. Additionally, the recognition processing unit 101 integrates the acceleration and angular velocity obtained from the detection unit 251 by inertial navigation on the basis of the current position, posture, and speed of the input/output device 20, and thereby calculates the latest position, posture, speed, and angular velocity.

Note that the above is merely an example, and the method and configuration are not particularly limited as long as the position and posture of the viewpoint can be recognized. That is, the configuration of the imaging unit 201, the detection unit 251, and other components may be changed as appropriate according to the method of recognizing the position and posture of the viewpoint.

Then, the recognition processing unit 101 outputs information regarding the result of self-localization of the input/output device 20 (i.e., recognition result of position and posture of viewpoint) to the prediction processing unit 103.

The prediction processing unit 103 acquires information regarding the result of self-localization of the input/output device 20 (i.e., recognition result of position and posture of viewpoint) from the recognition processing unit 101. The prediction processing unit 103 predicts the future position and posture of the input/output device 20 on the basis of the acquired information. As a specific example, the prediction processing unit 103 may extrapolate the position, posture, speed, and angular velocity of the input/output device 20 according to the result of self-localization of the input/output device 20 by linear interpolation to predict the future position and posture of the input/output device 20. Then, the prediction processing unit 103 outputs information regarding the prediction result of the position and posture of the input/output device 20 (in other words, viewpoint) to the drawing processing unit 105 and the correction processing unit 109. Note that in the following description, the position and posture of the viewpoint at timing $t_r$ may be denoted as eyepose $[t_r]$.

The drawing processing unit 105 acquires the information regarding the prediction result of the position and posture of the viewpoint from the prediction processing unit 103, and draws display information to be presented in a predetermined buffer according to the position and posture of the viewpoint based on the acquired information. At this time, the drawing processing unit 105 may project a target object (e.g., virtual object having three-dimensional information) according to the position and posture of the viewpoint onto a screen surface (e.g., display area of output unit 211) defined in association with the viewpoint, and draw display information (i.e., two-dimensional display information) according to the projection result in the buffer described above. Note that while the drawing processing unit 105 will be described as drawing the above-mentioned drawing result in the frame buffer 107 for convenience in the following description, the area in which the above-mentioned drawing result is held is not necessarily limited. Additionally, the drawing processing unit 105 corresponds to an example of a "projection processing unit". Additionally, of the drawing processing unit 105, a part that acquires information regarding the prediction result of the position and posture of the viewpoint from the prediction processing unit 103 (i.e., information according to recognition result of position and posture of viewpoint) corresponds to an example of an "acquisition unit".

Additionally, the drawing processing unit 105 may acquire information regarding the recognition result of the position of a body in real space from the recognition processing unit 101. In this case, the drawing processing unit 105 may draw display information according to the recognition result of the body in real space (real object), for example. As a specific example, the drawing processing unit 105 may project an object to be presented onto a screen surface according to the position and posture relationship between a body in real space and the object to be presented, and draw display information according to the projection result in the buffer described above. Additionally, at this time, the drawing processing unit 105 may control the position in which to fix the object in real space, so that the object is superimposed on the body in real space according to the recognition result of the position and the posture of the viewpoint. Note that in the following description, display information (e.g., two-dimensional display information such as image) drawn by the drawing processing unit 105 according to the projection result of an object is also referred to as a "reference frame" for convenience. Additionally, a reference frame corresponding to eyepose [$t_r$] may be denoted as freme$_{ref}$[$t_r$].

Additionally, the drawing processing unit 105 may control the color and brightness of display information drawn in the buffer described above according to various conditions. As a specific example, when a target object is projected onto a display area, the drawing processing unit 105 may control the color and brightness when drawing the object as display information, according to the positional relationship between a light source and the object defined in three-dimensional space. Additionally, in a case where the drawing processing unit 105 presents display information so that it is superimposed on a body in real space on the basis of AR technology, the drawing processing unit 105 may control the color and brightness when drawing the display information, according to the positional relationship between the body and the display information.

Additionally, the drawing processing unit 105 associates information (e.g., distance information such as Z value) according to the relative position and posture relationship between the viewpoint and the object with display information (reference frame) drawn according to the projection result of the object. Note that here, it is assumed that the drawing processing unit 105 associates distance information according to the distance between the viewpoint and the object with the display information.

The frame buffer 107 is a storage area for temporarily or permanently holding various data. The frame buffer 107 holds a drawing result (i.e., reference frame) of display information by the drawing processing unit 105, for example.

The correction processing unit 109 makes various corrections to the display information (reference frame) drawn in the frame buffer 107 by the drawing processing unit 105. As a specific example, in a case where the position or posture of the viewpoint of display information drawn in the buffer by the drawing processing unit 105 changes before the display information is presented on the output unit 211 by the output control unit 111 described later, the correction processing unit 109 may apply correction (processing corresponding to so-called reprojection) of the display information according to the change in the position or posture of the viewpoint.

Specifically, as described above with reference to FIG. 7, the correction processing unit 109 restores three-dimensional information of the object that is the projection source of the display information, on the basis of display information (reference frame) held in the frame buffer 107 and distance information associated with the display information. Additionally, the correction processing unit 109 acquires information regarding the prediction result of the position and posture of the viewpoint at the presentation timing of the display information through the output unit 211 from the prediction processing unit 103, and reprojects the restored object according to the position and posture of the viewpoint based on the acquired information. As described above, the correction processing unit 109 corrects the display information (reference frame) held in the frame buffer 107. That is, the presentation position and shape of the display information are corrected according to the position and posture of the viewpoint after movement.

As described above, when the correction processing unit 109 makes various corrections to the display information held in the frame buffer 107, the output control unit 111 causes the output unit 211 to present the corrected display information at the timing when information is presented through the output unit 211.

Note that the application unit of the above-mentioned processing by the correction processing unit 109 and the output control unit 111 may be appropriately changed according to the method for causing the output unit 211 to present information. For example, in a case of applying a method in which information is presented through the output unit 211 by so-called global illumination, the above-described processing may be applied by the correction processing unit 109 and the output control unit 111 on a screen-by-screen basis. Additionally, in a case of applying a method such as so-called scan line illumination in which the display area of the output unit 211 is divided into multiple subareas (e.g., lines or tiles) and pieces of display information are sequentially presented for the subareas, the correction processing unit 109 and the output control unit 111 may apply the above-described processing to each part including one or more of the subareas.

Note that the functional configuration of the information processing system 1 shown in FIG. 8 is merely an example, and the functional configuration of the information processing system 1 is not necessarily limited to the example shown in FIG. 8 as long as the operation of each configuration described above can be implemented. As a specific example, at least one of the imaging unit 201, the detection unit 251, or the output unit 211 may be integrated with the information processing device 10. Additionally, as another example, some functions of the information processing device 10 may be provided outside the information processing device 10. As a specific example, a part corresponding to the recognition processing unit 101 or the prediction processing unit 103 may be provided outside the information processing device 10. Note that in this case, an interface for acquiring information from the part corresponding to the recognition processing unit 101 or the prediction processing unit 103 provided outside the information processing device 10 may correspond to an example of an "acquisition unit" that acquires information according to the recognition result of the position and posture of the viewpoint. Additionally, at least some functions of the information processing device 10 may be implemented by multiple devices operating in cooperation with each other.

Hereinabove, an example of the functional configuration of the information processing system according to the embodiment of the present disclosure has been described with reference to FIG. 8.

3.3. Processing

Figure 9:
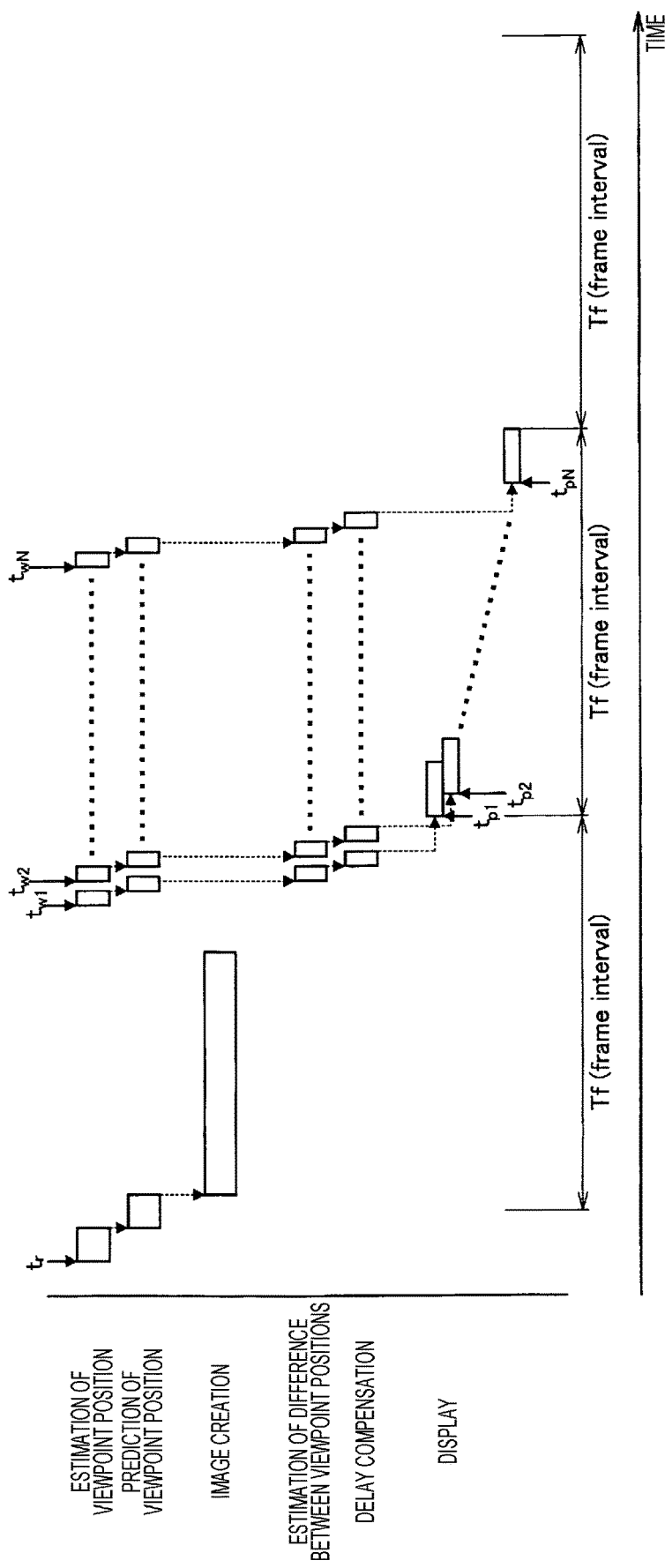
FIG. 9 is a timing chart showing an example of the flow of a series of processing of the information processing system according to the same embodiment.

Subsequently, an example of the flow of a series of processing of the information processing system according to the embodiment of the present disclosure will be described. For example, FIG. 9 is a timing chart showing an example of the flow of a series of processing of the information processing system according to the present embodiment, and in particular, focuses on processing by the information processing device 10 for presenting information to the user through the output unit 211 of the input/output device 20 according to changes in the position and posture of the input/output device 20. In FIG. 9, reference sign Tf schematically shows a unit period related to presentation of information through the output unit, and corresponds to a frame interval, for example.

In the example shown in FIG. 9, an exemplary case (e.g., case of scan line illumination) is shown in which the display area of the output unit 211 is divided into N subareas, and pieces of information are sequentially presented for the subareas. That is, in the example shown in FIG. 9, when display information is presented in the display area of the output unit 211, the frame interval is divided into N, and the display information is presented in the display area in N separate times. In FIG. 9, reference signs $t_{p1}$ to $t_{pN}$ each show the timing when presentation of display information is started for each of the N subareas into which the display area is divided. Additionally, reference signs $t_{w1}$ to $t_{wN}$ schematically show the timings immediately before timings $t_{p1}$ to $t_{pN}$, respectively.

Specifically, prior to processing related to presentation of display information through the output unit 211, projection of the object to be presented and drawing of display information according to the result of the projection are performed. More specifically, in the example shown in FIG. 9, before the start timing (e.g., timing $t_{p1}$) of the frame in which display information is presented, the future position and posture of the viewpoint is predicted according to the estimation result of the position and posture of the viewpoint at timing $t_r$, and processing related to image creation, that is, processing related to projection of an object and processing related to drawing display information according to the result of the projection are performed according to the result of the prediction.

Subsequently, at each of timings $t_{p1}$ to $t_{pN}$ when display information is presented in each subarea into which the display area is divided, processing related to correction of the part corresponding to the relevant subarea of the above display information held in the buffer according to the drawing result is performed.

For example, of the display information, as for a part corresponding to the subarea where information is presented at timing $t_{p1}$, the position and posture of the viewpoint at timing $t_{p1}$ are predicted on the basis of the estimation result of the position and posture of the viewpoint at timing $t_{w1}$ immediately before timing $t_{p1}$. Next, from the result of the prediction, the difference between the position and posture of the viewpoint at the timing when the target display information is drawn and the position and posture of the viewpoint at timing $t_{p1}$ is estimated, and processing related to correction of the display information (in other words, processing related to delay compensation) is performed on the basis of the result of estimation of the difference. Specifically, the object is restored from the display information held in the buffer, and the restored object is reprojected on the screen surface according to the position and posture of the viewpoint at timing $t_{p1}$ mentioned above. As described above, correction of the above-mentioned display information held in the buffer (e.g., correction of presentation position, correction of shape, or the like) is performed. Then, at timing $t_{p1}$, processing related to presentation of the display information having undergone correction for the corresponding subarea is started.

Additionally, as for a part corresponding to the subarea where information is presented at timing $t_{p2}$ following timing $t_{p1}$, the position and posture of the viewpoint at timing $t_{p2}$ is predicted on the basis of the estimation result of the position and posture of the viewpoint at timing $t_{w2}$ immediately before timing $t_{p2}$. Then, from the result of the prediction, the difference between the position and posture of the viewpoint at the timing when the target display information is drawn and the position and posture of the viewpoint at timing $t_{p2}$ is estimated, and processing related to correction of the display information is performed on the basis of the result of estimation of the difference. Then, at timing $t_{p2}$, processing related to presentation of the display information having undergone correction for the corresponding subarea is started. The above processing is sequentially performed for the subareas. As described above, in the example shown in FIG. 9, the processing related to the above correction (in other words, processing related to reprojection), which is sequentially performed for the subareas, is performed in a shorter cycle than the cycle of the processing related to projection and drawing of the object according to the position and posture of the viewpoint before movement.

Note that as described above, in the situation where correction of display information is applied by dividing the frame interval into N, if the number of divisions N is too small, not only will the error of the superimposition position increase, but also tearing may occur between corrected display frames. For this reason, it is desirable that the number of divisions N is set according to the specification of the system and the contents to be presented, for example. As a specific example, on the basis of the upper limit of the speed at which an object (superimposed object) moves within the screen (i.e., upper limit of relative speed between viewpoint and object), it is desirable that the number of divisions N is determined so that the position of the object does not shift for 1 px or more between display frames. As a more specific example, assuming that the horizontal resolution of the output unit is 1280 px, the horizontal angle of view is 30 deg, the frame rate is 60 fps, and the upper limit of the rotation speed of the viewpoint (e.g., user's head) is 100 deg/sec, N=18 may be set on the basis of the calculation formulas shown below as (Equation 1) and (Equation 2).

[Expression 1]

$$1280\ [\text{px}]/30\ [\text{deg}]*100\ [\text{deg/sec}]/60\ [\text{frame/sec}] \approx 71\ \text{px/frame} \qquad \text{EQUATION 1}$$

$$1280/71 \approx 17.8 \qquad \text{EQUATION 2}$$

Additionally, among the above-mentioned subareas, some subareas correspond to an example of a "first subarea", and a subarea different from the first subarea corresponds to an example of a "second subarea". Additionally, of the display information to be presented through the output unit (i.e., display information according to result of projection and drawing of object), a part to be presented in the first subarea corresponds to an example of "first display information", and a part to be presented in the second subarea corresponds to an example of "second display information". That is, in this case, the presentation of the first display information and the presentation of the second display information are controlled at different timings.

Hereinabove, an example of the flow of a series of processing of the information processing system according to the embodiment of the present disclosure has been described with reference to FIG. 9.

3.4. Example

Subsequently, as an example, a more specific example of processing related to correction of display information according to the result of projection and drawing of an object, that is, processing related to restoration and reprojection of an object by the information processing system according to the embodiment of the present disclosure will be described. Specifically, the unit of the processing related to the restoration and reprojection of an object described with reference to FIG. 7 is not particularly limited, and the processing related to the restoration and the reprojection may be performed for each object, or may be performed for each part of an object.

Example 1: Restoration and Reprojection in Pixel Units

Figure 11:
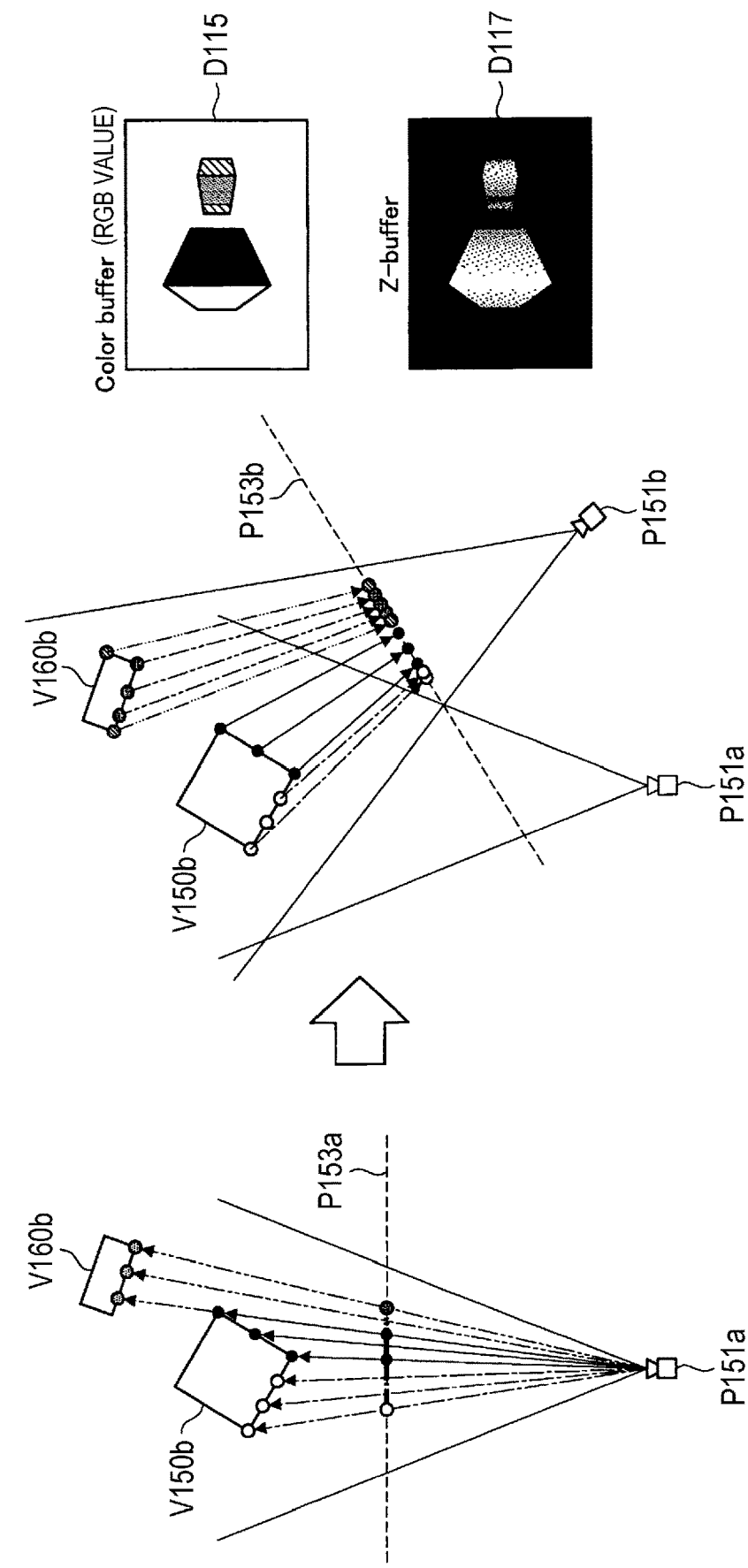
FIG. 11 is an explanatory diagram for describing an outline of Example 1 of the information processing system according to the same embodiment.

First, as Example 1, an example of a case where the above-mentioned processing related to restoration and reprojection of an object is performed for each pixel of display information according to the result of projection and drawing of the object will be described with reference to FIGS. 10 and 11. FIGS. 10 and 11 are explanatory diagrams for describing an outline of the Example 1 of the information processing system according to the embodiment of the present disclosure, and show an example of a case where an object is restored and reprojected in pixel units. Note that in FIGS. 10 and 11, the same reference signs as those in FIG. 7 show the same objects as those in the example shown in FIG. 7.

First, processing related to restoration of an object will be described with reference to FIG. 10. The left drawing of FIG. 10 schematically shows processing related to projection and drawing of an object, and since it is the same as the left drawing of FIG. 7, detailed description is omitted. Additionally, reference sign D111 schematically shows the state of a buffer in which the object shown in the left drawing of FIG. 10 is projected and drawn, and is also referred to as "color buffer" for convenience. That is, the color buffer D111 holds display information (more specifically, information such as RGB value of each pixel) according to the result of projection and drawing of the object. Additionally, reference sign D113 schematically shows the state of a buffer in which distance information associated with the display information is held, and is also referred to as "z-buffer" for convenience. That is, in the z-buffer D113, the distance between the viewpoint and a part of the object corresponding to a pixel is presented by the brightness of the pixel for each pixel of the display information held in the color buffer D111. Specifically, in the example shown in FIG. 10, in the z-buffer D113, a pixel corresponding to a part closer to the viewpoint is presented whiter, and a pixel corresponding to a part farther away from the viewpoint is presented blacker.

Next, as shown in the right drawing of FIG. 10, processing related to the restoration of the object is performed on the basis of the display information held in the color buffer D111 and the distance information held in the z-buffer D113. Specifically, in the example shown in FIG. 10, each pixel of the display information corresponding to the objects V150a and V160a held in the color buffer D111 is projected in three-dimensional space on the basis of the distance information corresponding to the pixel held in the z-buffer D113. As a result, the objects V150a and V160a are restored. For example, the objects V150b and V160b show the restoration results of the objects V150a and V160a.

Subsequently, processing related to reprojection of an object will be described with reference to FIG. 11. The left drawing of FIG. 11 corresponds to the right drawing of FIG. 10. Additionally, the right drawing of FIG. 11 schematically shows processing related to reprojection of the objects shown in the left drawing of FIG. 11 based on the restoration result of the objects.

In the example shown in the right drawing of FIG. 11, the objects V150b and V160b restored in units of pixels of the display information are reprojected on the projection surface P153b, which is defined in association with the viewpoint P151b after movement, for each part corresponding to the pixel. For example, reference sign D117 schematically shows the state of the z-buffer at the time of reprojection shown in the right drawing of FIG. 11 (i.e., distance between each part of objects V150b and V160b and viewpoint P151b). Additionally, reference sign D115 schematically shows the state of the color buffer according to the result of reprojection shown in the right drawing of FIG. 11.

As shown in the color buffer D115 and the z-buffer D117, it can be seen that the objects V150 and V160 as viewed from the viewpoint P151 after movement are reproduced more accurately.

Note that in the example shown in FIGS. 10 and 11, when restoring the objects, it may be difficult to restore parts of the object V160 that are visually recognizable from the viewpoint P151b but are difficult to visually recognize from the viewpoint P151a. An example of a method for solving such a problem will be described later as a modification.

Hereinabove, as Example 1, an example of a case where the above-mentioned processing related to restoration and reprojection of an object is performed for each pixel of display information according to the result of projection and drawing of the object has been described with reference to FIGS. 10 and 11.

Example 2: Restoration and Reprojection in Object Units

Figure 12:
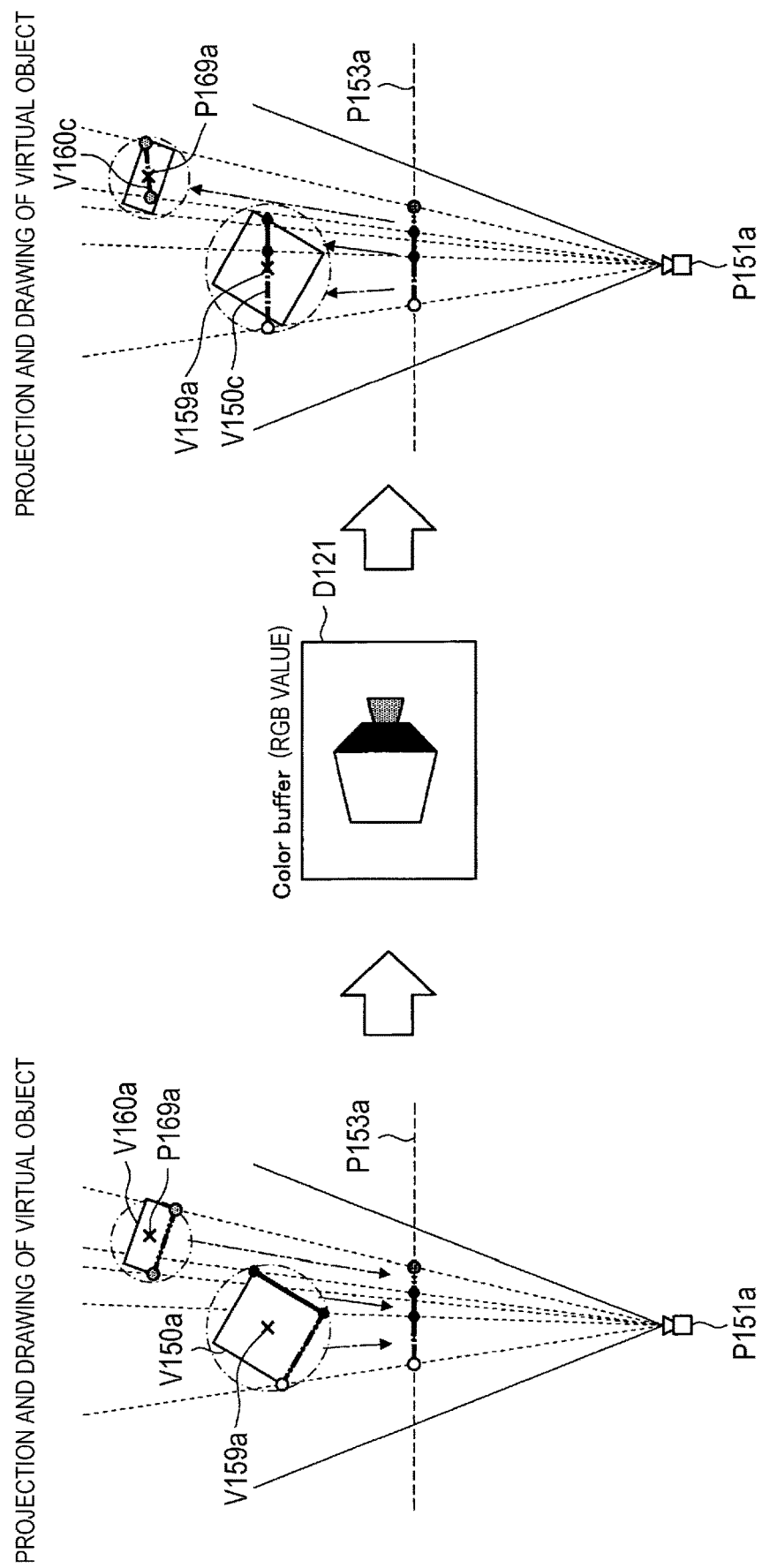
FIG. 12 is an explanatory diagram for describing an outline of Example 2 of the information processing system according to the same embodiment.
Figure 13:
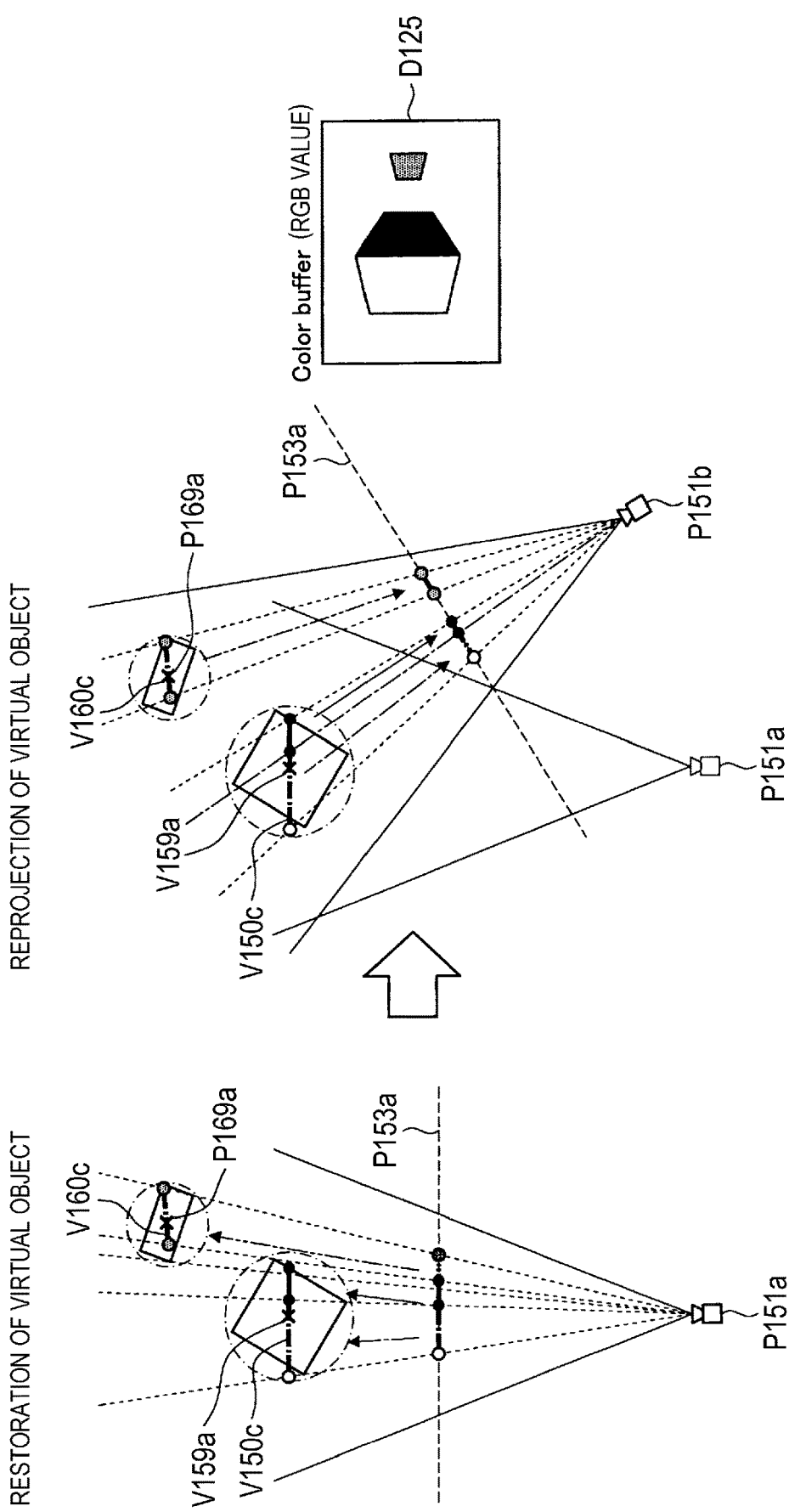
FIG. 13 is an explanatory diagram for describing an outline of Example 2 of the information processing system according to the same embodiment.

Subsequently, as Example 2, an example of a case where the above-mentioned processing related to restoration and reprojection of an object is performed for each object will be described with reference to FIGS. 12 and 13. FIGS. 12 and 13 are explanatory diagrams for describing an outline of Example 2 of the information processing system according to the embodiment of the present disclosure, and show an example of a case where objects are restored and reprojected in object units. Note that in FIGS. 12 and 13, the same reference signs as those in FIG. 7 show the same objects as those in the example shown in FIG. 7.

First, as shown in the left drawing of FIG. 12, the objects are projected and drawn. At this time, distance information according to the distance between the viewpoint and a point representing the position of a corresponding object (e.g., center of bounding sphere) is associated with display information according to the result of the projection and the drawing. For example, reference sign V159a schematically shows a point representing the position of the object V150a (hereinafter also referred to as "representative point"). Additionally, reference sign V169a schematically shows the representative point of the object V160a. That is, distance information according to the distance between the viewpoint P151a and the representative point V159a is associated with the display information according to the projection result of the object V150a. Similarly, distance information according to the distance between the viewpoint P151a and the representative point V169a is associated with the display information according to the projection result of the object V160a.

For example, reference sign D121 schematically shows the state of the color buffer according to the result of projection and drawing of the object shown in the left drawing of FIG. 10. That is, distance information according to the distance between the representative point of the object and the viewpoint P151a is associated with display information corresponding to each of the objects V150a and V160a held in the color buffer D121. Incidentally, it is assumed that it is possible to identify which object each pixel of the display information held in the color buffer D121 corresponds to. As a specific example, by associating identification information (objectid) of the corresponding object with each pixel of the display information, it is possible to identify which object the pixel corresponds to. It goes without saying that the method is not particularly limited as long as it is possible to identify which object each pixel corresponds to.

Next, as shown in the right drawing of FIG. 12, processing related to restoration of the object is performed on the basis of the display information held in the color buffer D121 and the distance information associated with the display information for each object. At this time, three-dimensional information of the object is restored by projecting each pixel of the display information for each object in three-dimensional space, so that the distance between the projected position of the pixel and the viewpoint is the distance between the viewpoint and the representative point of the object for each pixel. In the right drawing of FIG. 12, reference signs V150c and V160c schematically show the restoration results of the objects V150a and V160a.

As a specific example, assume that the coordinates of each pixel of the display information on the screen surface P153a are (sx, sy), and the distance between the representative point V159a of the object V150a and the viewpoint P151a is sz1. At this time, the coordinates (wx, wy, wz) in three-dimensional space in which the pixel corresponding to the object V150a is projected are calculated by projection based on the coordinates (sx, sy) of the pixel on the screen surface P153a and the distance sz1 relative to the position and posture of the viewpoint P151a. Similarly, assume that the distance between the representative point V169a of the object V160a and the viewpoint P151a is sz1. At this time, the coordinates (wx, wy, wz) in three-dimensional space in which the pixel corresponding to the object V160a is projected are calculated by projection based on the coordinates (sx, sy) of the pixel on the screen surface P153a and the distance sz2 relative to the position and posture of the viewpoint P151a.

Subsequently, processing related to reprojection of an object will be described with reference to FIG. 13. The left drawing of FIG. 13 corresponds to the right drawing of FIG. 12. Additionally, the right drawing of FIG. 13 schematically shows processing related to reprojection of the objects shown in the left drawing of FIG. 13 based on the restoration result of the objects.

In the example shown in the right drawing of FIG. 13, the objects V150c and V160c restored in units of pixels of the display information are reprojected on the projection surface P153b, which is defined in association with the viewpoint P151b after movement, for each part corresponding to the pixel. For example, reference sign D125 schematically shows the state of the color buffer according to the result of reprojection shown in the right drawing of FIG. 13.

Note that as shown in FIGS. 12 and 13, in the example shown as Example 2, the objects V150a and V160a are degenerated and restored as two-dimensional plate-shaped objects V150c and V160c, and the restoration result is reprojected. Due to such a characteristic, the appearance of a part of the display information according to the result of reprojection may deviate from the original appearance thereof as viewed from the viewpoint P151b. On the other hand, in a case where the change in position and posture between the viewpoint P151a before movement and the viewpoint P151b after movement is relatively small, the above-mentioned deviation is smaller and less likely to be perceived by the user. In particular, in delay compensation in the case of presenting information on the basis of AR technology, the change in the position and posture of the viewpoint when the delay compensation is applied is relatively small. Hence, in the case where the method according to the present embodiment is applied, too, the above-mentioned deviation is less likely to be perceived by the user.

Hereinabove, as Example 2, an example of a case where the above-mentioned processing related to restoration and reprojection of an object is performed for each object has been described with reference to FIGS. 12 and 13.

(Supplement)

Each of the methods described as Example 1 and Example 2 above is merely an example, and does not necessarily limit the unit in which to apply the above-described processing related to restoration and reprojection of an object. As a specific example, the above-described processing related to restoration of an object and processing related to reprojection according to the result of the restoration may be performed by regarding, as a unit of processing, a part including at least any of one or more edges, one or more vertices, or one or more voxels included in the object. In other words, the above-described processing related to restoration of an object and processing related to reprojection according to the result of the restoration may be performed by regarding, as a unit of processing, a part including one or more predetermined unit data included in the object. Additionally, the above-described processing related to restoration of an object and processing related to reprojection according to the result of the restoration may be performed by regarding, as a unit of processing, a part including one or more predetermined unit data (e.g., pixel) included in display information according to the result of projection and drawing of the object as in the aforementioned example described with reference to FIGS. 10 and 11.

3.5. Modification

Subsequently, modifications of the information processing system according to the embodiment of the present disclosure will be described.

(Modification 1)

First, as Modification 1, an example of a method of complementing a blind spot during projection and drawing of an object will be described with reference to FIGS. 14 to 17. FIGS. 14 to 17 are explanatory diagrams for describing an outline of an information processing system according to Modification 1.

First, the technical problem of the information processing system according to Modification 1 will be described in more detail with reference to FIG. 14. FIG. 14 schematically shows a situation where an object is projected and drawn, the object is restored, and the restored object is reprojected, as in the example described with reference to FIG. 7. Note that in FIG. 14, the same reference signs as those in FIG. 7 show the same objects as those in the example shown in FIG. 7. Additionally, since the left and center drawings of FIG. 14 are the same as the left and center drawings of FIG. 7, detailed description thereof will be omitted.

In the example shown in FIG. 14, when the objects V150a and V160a are viewed from the viewpoint P151a, a part of the object V160a becomes a blind spot, and for this part, it is difficult to restore three-dimensional information when the objects are restored. For example, in the right drawing of FIG. 14, of the object V160, parts indicated by reference signs V165 and V166 correspond to the parts that become blind spots when the objects V150a and V160a are viewed from the viewpoint P151a, and are parts whose three-dimensional information is difficult to restore when the objects are restored. For this reason, when reprojecting the restored object V160b onto the screen surface P153b as shown in the right drawing of FIG. 14, there is no information about the parts indicated by the reference signs V165 and V166, and display information lacking parts of the object V160 may be presented.

Figure 15:
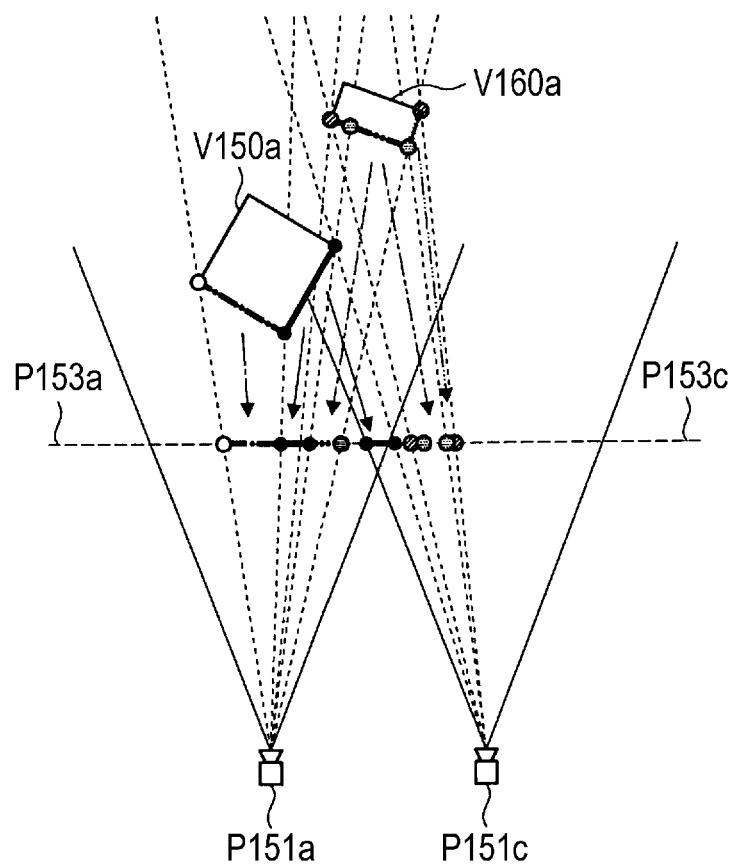
FIG. 15 is an explanatory diagram for describing an outline of the information processing system according to Modification 1.

Modification 1 proposes a method for solving the above-mentioned technical problem. Specifically, in the information processing system according to Modification 1, projection and drawing of the target object are performed from multiple different viewpoints, and three-dimensional information of the object is restored on the basis of the result of the projection and the drawing. For example, FIG. 15 schematically shows a situation where multiple target objects are projected and drawn for multiple viewpoints. Specifically, in the example shown in FIG. 15, projection and drawing of the target objects V150a and V160a are performed for different viewpoints P151a and P151c.

Here, an outline of processing related to projection and drawing of an object in the information processing system according to Modification 1 will be described with reference to FIG. 16. Note that in FIG. 16, the same reference signs as those in FIG. 14 show the same objects as those in the example shown in FIG. 14.

First, the left drawing of FIG. 16 will be described. The left drawing of FIG. 16 schematically shows a situation where the objects V150a and V160a are projected onto the projection surface P153a defined in association with the viewpoint P151a, and display information is drawn according to the result of the projection. Specifically, reference signs V155a and V157a schematically show display information according to the result of projection and drawing of parts of the object V150a indicated by reference signs V151a and V153a. Additionally, reference sign V163a schematically shows display information according to the result of projection and drawing of a part of the object V160a indicated by reference sign V161a. On the other hand, it can be seen that parts of the object V160a indicated by reference signs V165a and V166a are blind spots when viewed from the viewpoint P151a, and are not targets of projection and drawing.

Next, the right drawing of FIG. 16 will be described. The right drawing of FIG. 16 schematically shows a situation where the objects V150a and V160a are projected onto a projection surface P153c defined in association with the viewpoint P151c, and display information is drawn according to the result of the projection. Specifically, reference sign V157c schematically shows display information according to the result of projection and drawing of the part of the object V150a indicated by the reference sign V153a. Additionally, reference signs V163c, V167c, and V168c schematically show display information according to the result of projection and drawing of the parts of the object V160a indicated by the reference signs V161a, V165a, and V166a.

As can be seen by comparing the left and right drawings of FIG. 16, the parts of the object V160a indicated by the reference signs V165a and V166a, which were blind spots when viewed from the viewpoint P151a, can be visually recognized from the viewpoint P151c. For this reason, the result of projection and drawing of the objects with respect to the viewpoint P151c shown in the right drawing of FIG. 16 reflects the information of the parts indicated by the reference signs V165a and V166a. That is, the parts indicated by the reference signs V165a and V166a can be restored on the basis of the result of projection and drawing of the objects with respect to the viewpoint P151c.

Additionally, when viewed from the viewpoint P151c, the part of the object V150a indicated by the reference sign V151a is a blind spot. That is, information of the part indicated by the reference sign V151a is not reflected in the result of projection and drawing of the objects with respect to the viewpoint P151c. On the other hand, from the viewpoint P151a, the part indicated by the reference sign V151a can be visually recognized. For this reason, the information of the part indicated by the reference sign V151a is reflected in the result of projection and drawing of the objects with respect to the viewpoint P151a shown in the left drawing of FIG. 16. That is, the part indicated by the reference sign V151a can be restored on the basis of the result of projection and drawing of the objects with respect to the viewpoint P151a.

In the information processing system according to Modification 1, using the above characteristics, for a part of the target object that is difficult to visually recognize from one viewpoint, information from another viewpoint is used for complementation to restore the object. Then, the information processing system reprojects the restored object on the basis of the position and posture of the viewpoint after movement.

Figure 17:
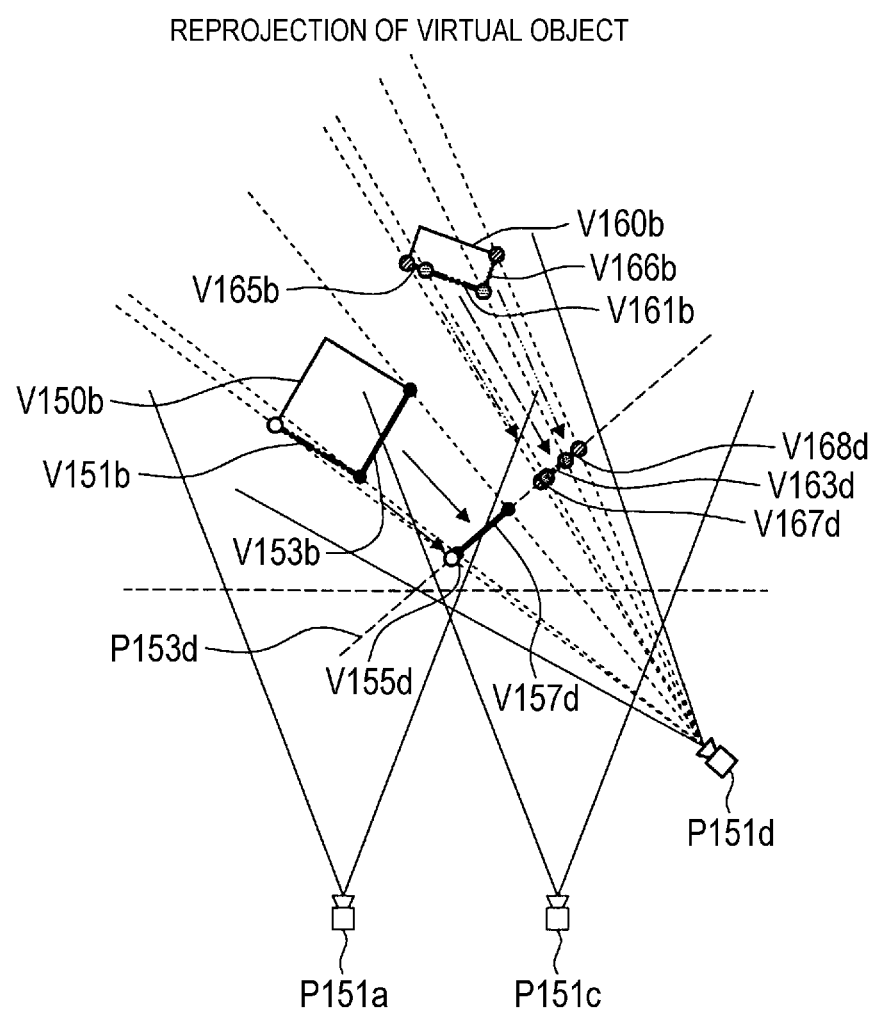
FIG. 17 is an explanatory diagram for describing an outline of the information processing system according to Modification 1.

Next, an outline of processing related to reprojection of an object in the information processing system according to Modification 1 will be described with reference to FIG. 17. FIG. 17 schematically shows a situation where the objects restored on the basis of the result of projection and drawing of the objects described with reference to FIG. 16 are reprojected on the basis of the position and posture of a viewpoint P151d after movement.

In FIG. 17, reference sign V150b schematically shows the restoration result of the object V150a shown in FIG. 16. That is, parts indicated by reference signs V151b and V153b schematically show the restoration result of the parts indicated by the reference signs V151a and V153a in FIG. 16. Additionally, reference sign V160b schematically shows the restoration result of the object V160a shown in FIG. 16. That is, parts indicated by reference signs V161b, V165b, and V166b schematically show the restoration result of the parts indicated by the reference signs V161a, V165a, and V166a in FIG. 16. Additionally, reference sign P153d schematically shows a screen surface defined in association with the viewpoint P151d. That is, reference signs V155d and V157d schematically show the result of reprojection of the parts of the restored object V150b indicated by the reference signs V151b and V153b onto the screen surface P153d. Additionally, reference signs V163d, V167d, and V168d schematically show the result of reprojection of the parts of the restored object V160b indicated by the reference signs V161b, V165b, and V166b onto the screen surface P153d.

As described above, in the information processing system according to Modification 1, by projecting and drawing the target object for each of multiple different viewpoints, a part that becomes a blind spot when viewed from some viewpoints and whose information does not exist is complemented with information from other viewpoints at the time of delay compensation. For this reason, it is desirable that the multiple viewpoints are set farther away from each other, and that the field of view (FoV) is set wider as well. For example, in a case where the input/output device 20 as shown in FIG. 2 is provided with separate imaging units corresponding to each of the multiple viewpoints, it is preferable that the distance between the multiple viewpoints (i.e., between multiple imaging units) is wider than the interpupillary distance of the user who wears the input/output device 20, for example. Additionally, it is sufficient that the target object is projected and drawn for multiple viewpoints, and it is not always necessary that a separate device (e.g., imaging unit) is provided for each of the multiple viewpoints. As a specific example, an object may be projected and drawn for each of multiple viewpoints by time-sharing using one movable device (e.g., imaging unit). Additionally, as the number of viewpoints increases, the area that becomes a blind spot can be reduced. Hence, it is possible to restore objects with more complicated shapes or restore a large number of randomly arranged objects, for example, with better accuracy.

Hereinabove, as Modification 1, an example of a method of complementing a blind spot during projection and drawing of an object has been described with reference to FIGS. 14 to 17.

(Modification 2)

Subsequently, as Modification 2, an example of a delay compensation method assuming a situation where an object moves autonomously will be described with reference to FIG. 18. FIG. 18 is an explanatory diagram for describing an outline of an information processing system according to Modification 2. Note that in FIG. 18, the same reference signs as those in FIG. 7 show the same targets as those in the example shown in FIG. 7.

In the information processing system according to Modification 2, the target objects V150a and V160a are projected and drawn as in the example shown in FIG. 7. On the other hand, in the information processing system according to Modification 2, information regarding the movement of the object is associated with display information according to the result of projection and drawing of the object. Information regarding the movement of the object includes information regarding the direction in which the object moves and the speed at which the object moves (e.g., information corresponding to speed vector), for example. Note that the information regarding the movement of the object associated with the display information described above corresponds to an example of "third information".

Specifically, the left drawing of FIG. 18 schematically shows processing related to restoration of an object. In the left drawing of FIG. 18, reference signs V155a and V157a schematically show display information according to the result of projection and drawing of the object V150a shown in FIG. 7 with respect to the viewpoint P151a. That is, in the information processing system according to Modification 2, information regarding the movement of the surface V151a of the object V150a shown in FIG. 7 is associated with the display information V155a. Additionally, information regarding the movement of the surface V153a of the object V150a shown in FIG. 7 is associated with the display information V157a. Additionally, reference sign V163a schematically shows display information according to the result of projection and drawing of the object V160a shown in FIG. 7 with respect to the viewpoint P151a. That is, in the information processing system according to Modification 2, information regarding the movement of the surface V161a of the object V160a shown in FIG. 7 is associated with the display information V163a. Under the above conditions, as shown in the left drawing of FIG. 18, processing related to restoration of the objects is performed.

Next, as shown in the center drawing of FIG. 18, correction of the restoration result of the object (e.g., correction of position, posture, shape, and the like) is performed on the basis of the information indicating the movement of each object. As a specific example, in the example shown in FIG. 18, the object V150a to be restored has movement, and the information regarding the movement of the surface V151a and the surface V153a of the object V150a is associated with the corresponding display information V155a and V157a. For this reason, in the center drawing of FIG. 18, the surfaces V151b and V153b of the object V150b shown in the left drawing of FIG. 18 are corrected on the basis of the information regarding the movement of the surfaces V151a and V153a of the object V150a associated with the display information V155a and V157a.

For example, reference sign V150c schematically shows the result of applying correction based on information indicating the movement of the object V150a to the object V150b. That is, the reference sign V151c schematically shows the result of applying, to the surface V151b of the object V150b, correction based on the information regarding the movement of the surface V151a of the object V150a associated with the corresponding display information V155a. Additionally, the reference sign V153c schematically shows the result of applying, to the surface V153b of the object V150b, correction based on the information regarding the movement of the surface V153a of the object V150a associated with the corresponding display information V157a.

As a specific example, on the basis of the above information regarding the movement of the surface V151a associated with the display information V155a, the movement of the surface V151a during a period from the timing when the object is projected and drawn to the timing when the information is presented to the user through the output unit is estimated. Then, on the basis of the result of the estimation, the correction direction and the correction amount of the surface V151b of the restored object V150b are derived, and the surface V151b is corrected. This also applies to the surface V153b of the object V150b.

Similarly, reference sign V160c schematically shows the result of applying correction based on information indicating the movement of the object V160a to the object V160b.

After the restoration result of each object is corrected to reflect the movement of the object as described above, reprojection based on the position and posture of a viewpoint P151e after movement is performed as shown in the right drawing of FIG. 18. That is, the corrected objects V150c and V160c are reprojected on a screen surface P153e defined in association with the viewpoint P151e. With the control described above, even in a situation where an object moves autonomously, the three-dimensional position and posture relationship between the viewpoint after movement and the object can be more accurately reflected at the time of delay compensation.

Hereinabove, as Modification 2, an example of a delay compensation method assuming a situation where an object moves autonomously has been described with reference to FIG. 18.

(Modification 3)

Subsequently, as Modification 3, an example of control in consideration of the relative position and posture relationship between the target object (virtual object) and a body in real space (real object) will be described with reference to FIGS. 19 to 22. FIGS. 19 to 22 are explanatory diagrams for describing an outline of an information processing system according to Modification 3.

Figure 19:
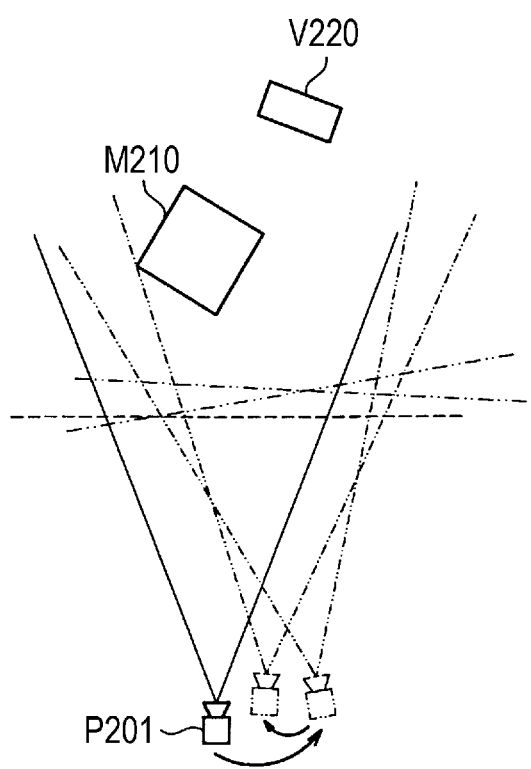
FIG. 19 is an explanatory diagram for describing an outline of the information processing system according to Modification 3.

First, an example of a scene to which the technology according to Modification 3 can be applied will be described with reference to FIG. 19. In FIG. 19, reference sign M210 schematically shows a body in real space (real object). On the other hand, reference sign V220 shows an object (virtual object) for which information is presented through the output unit, and presentation of information is controlled so as to fix the position of the object in a desired position in real space. Additionally, reference sign P201 schematically shows the position and posture of the viewpoint.

In a situation as shown in FIG. 19, in a case where the position or posture of the viewpoint P201 changes, one of the body M210 and the object V220 may overlap with the other. In such a case, it may be necessary to correct the display information according to the result of projection and drawing of the object V220 according to the front-rear relationship between the body M210 and the object V220. As a specific example, in a situation where a part of the object V220 is shielded by the body M210, it is desirable to curb presentation of the part of the object V220 that is shielded by the body M210 as display information. On the other hand, in a situation where a part of the body M210 is shielded by the object V220, it is desirable that the display information corresponding to the part of the object V220 that shields a part of the body M210 is presented so as to overlap the body M210.

In view of the above situation, in the information processing system according to Modification 3, control is performed so that the object to be presented is presented as display information by taking into consideration the three-dimensional position and posture relationship between the object to be presented and the body in real space. Hence, in the following, with reference to FIGS. 20 to 22, an example of processing related to object projection and drawing, object restoration, and object reprojection in the information processing system according to Modification 3 will be described in more detail. Note that in FIGS. 20 to 22, reference signs P201a, P201b, and P201c schematically show the position and posture of the viewpoint P201 moving along with time at different timings. Specifically, the viewpoint P201a shows the position and posture of the viewpoint P201 at timing $t_0$. Additionally, the viewpoint P201b shows the position and posture of the viewpoint P201 at timing $t_1$ after timing $t_0$. Additionally, the viewpoint P201c shows the position and posture of the viewpoint P201 at timing $t_2$ after timing $t_1$.

Figure 20:
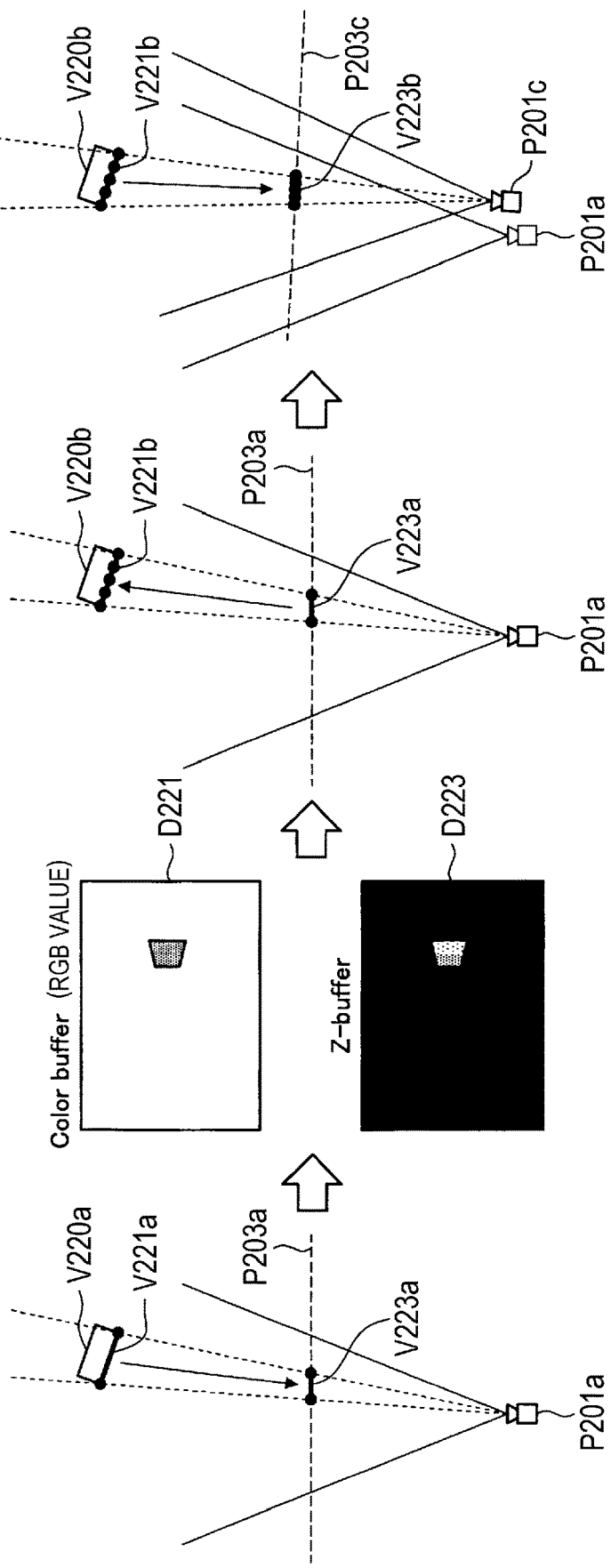
FIG. 20 is an explanatory diagram for describing an outline of the information processing system according to Modification 3.

First, processing for the object V220 will be described with reference to FIG. 20. In FIG. 20, reference sign V220a schematically shows an object to be projected and drawn according to the position and posture of the viewpoint P201a (i.e., object V220 shown in FIG. 19). On the other hand, reference sign V220b shows the restored object.

Specifically, first, as shown in the leftmost drawing of FIG. 20, processing related to projection and drawing of the object V220a is performed at timing $t_0$. Reference sign P203a schematically shows a screen surface defined in association with the viewpoint P201a. Additionally, reference sign V223a schematically shows display information according to the result of projection and drawing of a surface V221a of the object V220a onto the screen surface P203a. Note that in the example shown in FIG. 20, as in the example described above with reference to FIG. 10, information (e.g., distance information) according to the relative position and posture relationship between the viewpoint P201a and the object V220a is associated with the display information V223a.

For example, reference sign D221 schematically shows the state of the color buffer according to the result of projection and drawing of the object shown in the leftmost drawing of FIG. 20. Additionally, reference sign D223 schematically shows the state of the z-buffer in which distance information associated with the display information according to the result of projection and drawing of the object is held. Note that since the color buffer and the z-buffer are similar to those of the example shown in FIG. 10, detailed description thereof will be omitted.

Next, as shown in the third drawing from the left in FIG. 20, three-dimensional information of the object V220a is restored on the basis of the display information V223a and the distance information associated with the display information v223a. For example, reference sign V221b schematically shows the restoration result of the surface V221a of the object V220a.

Next, as shown in the rightmost drawing of FIG. 20, processing related to reprojection of the restored object V220b is performed at timing $t_2$. Reference sign P203c schematically shows a screen surface defined in association with the viewpoint P201c at timing $t_2$. That is, the restored object V220b is reprojected on the screen surface P203c according to the position and posture of the viewpoint P201c. Reference sign V223b schematically shows display information according to the result of reprojection of the surface V221b of the object V220b.

Subsequently, processing for the body M210 will be described with reference to FIG. 21. In the information processing system according to Modification 3, the processing for the body M210 as shown in FIG. 21 is performed in parallel with the processing for the object described with reference to FIG. 20.

Specifically, as shown in the leftmost drawing of FIG. 21, the position and posture of the body M210 are recognized at timing $t_1$. More specifically, in the example shown in the leftmost drawing of FIG. 21, a depth map corresponding to the measurement result of the distance between the viewpoint P201b and the body M210 is created by so-called depth sensing. For example, reference sign D211 shows the depth map. Specifically, the depth map D211 may correspond to data in which information according to the measurement result of the distance between the viewpoint P201b and each part of the body M210 is mapped to a corresponding position on a screen surface P203b defined in association with the viewpoint P201b. Specifically, in the example shown in FIG. 21, in the depth map D211, a pixel corresponding to a part closer to the viewpoint is presented whiter, and a pixel corresponding to a part farther away from the viewpoint is presented blacker. That is, the depth map D211 corresponds to an example of "fourth information" according to the relative position and posture relationship between the viewpoint P201b and the body M210.

Next, as shown in the third drawing from the left in FIG. 21, three-dimensional information (e.g., position, posture, shape, and the like) of the body M210 is restored on the basis of the depth map D211. Note that the principle of the processing related to the restoration is substantially similar to the processing related to restoration of an object based on distance information described above. That is, three-dimensional information of the body M210 is restored by projecting each pixel of the depth map D211 in three-dimensional space on the basis of the value of the pixel (i.e., information regarding distance). Note that reference sign M213 schematically shows virtual information (object) according to the restoration result of the body M210.

Next, as shown in the rightmost drawing of FIG. 21, processing related to reprojection of the restored object M213 is performed at timing $t_2$. Specifically, the restored object M213 is reprojected on the screen surface P203c according to the position and posture of the viewpoint P201c. Reference sign M215 schematically shows information according to the result of reprojection of the object M213 (hereinafter also referred to as "reprojected image" for convenience).

As described above, at timing $t_2$, the display information V223b corresponding to the object V220 and the reprojected image M215 corresponding to the body M210 are acquired according to the position and posture of the viewpoint P201c. Then, as shown in FIG. 22, presentation of the display information V223b corresponding to the object V220b through the output unit is controlled according to the relative positional relationship between the restored objects V220b and M213 (particularly, front-rear relationship with respect to viewpoint P201c).

Figure 22:
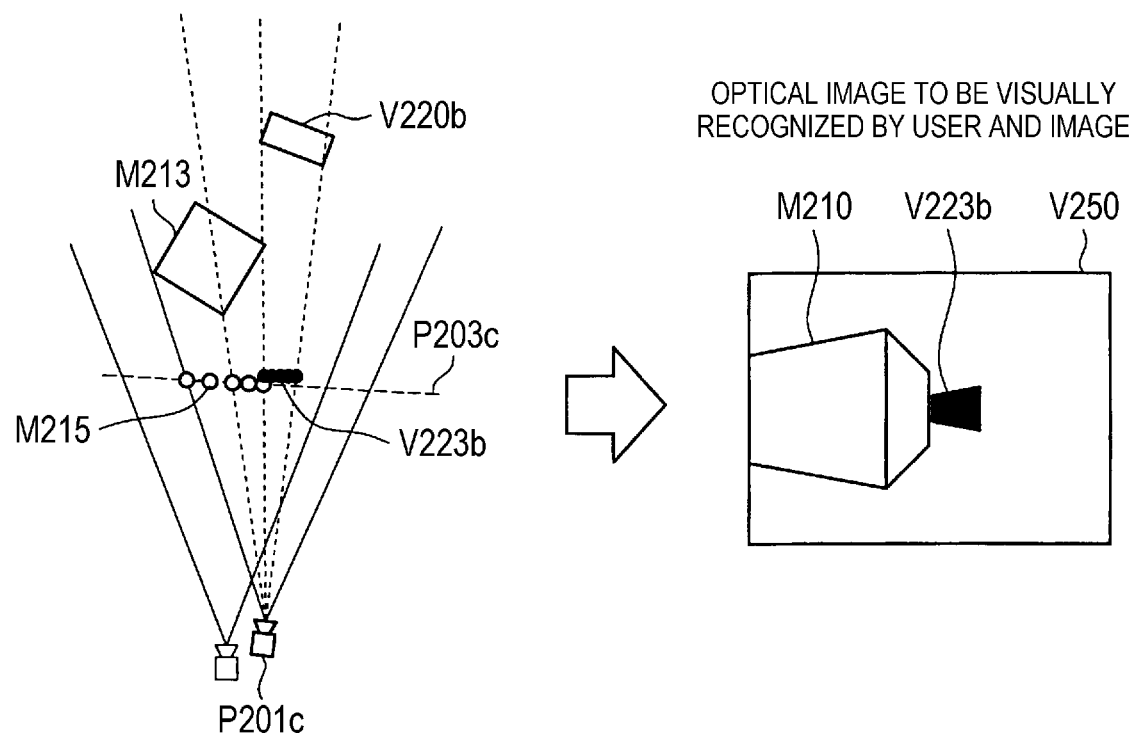
FIG. 22 is an explanatory diagram for describing an outline of the information processing system according to Modification 3.

Specifically, in the left drawing of FIG. 22, a part of the display information V220b and a part of the reprojected image M215 overlap on the screen surface P203c. At this overlapping part, one of the part of the display information V220b and the part of the reprojected image M215 shields the other, depending on the front-rear relationship between the object V220b and the object M213. Specifically, in the example shown in the left drawing of FIG. 22, since the object M213 is located closer to viewpoint P201c than the object V220b, the part of the display information V220b is shielded by the part of the reprojected image M215. For this reason, in the example shown in FIG. 22, presentation of information through the output unit is curbed for the part of the display information V220b shielded by the reprojected image M215.

For example, reference sign V250 schematically shows a combined image of an optical image of the body M210 visually recognized by the user and the display information V223b presented so as to overlap the body M210 when viewed from the viewpoint P201c.

As described above, according to the information processing system according to Modification 3, in a case where, among multiple restored objects (e.g., virtual object and object according to restoration result of body in real space), at least a part of the result of reprojection of a first object and at least a part of the result of reprojection of a second object different from the first object overlap, presentation of the object closer to the viewpoint after movement is given higher priority. Note that while the relationship between a body in real space and a virtual object has been focused on in the above description, the same applies to the relationship between different virtual objects. That is, in a case where there is a part where multiple virtual objects overlap when viewed from a desired viewpoint, presentation of display information according to the result of projection and drawing of the virtual object closer to the viewpoint is given higher priority.

As described above, according to the information processing system according to Modification 3, it is possible to control presentation of display information corresponding to the object V220, so that the front-rear relationship between the body M210 and the object V220 is reflected more accurately as shown as the combined image V250 in FIG. 22.

Hereinabove, as Modification 3, an example of control in consideration of the relative position and posture relationship between the target object (virtual object) and a body in real space (real object) has been described with reference to FIGS. 19 to 22.

4. HARDWARE CONFIGURATION

Subsequently, an example of a hardware configuration of the information processing device 10 included in the information processing system according to the present embodiment will be described.

4.1. Configuration Example as Device Capable of Independent Operation

Figure 23:
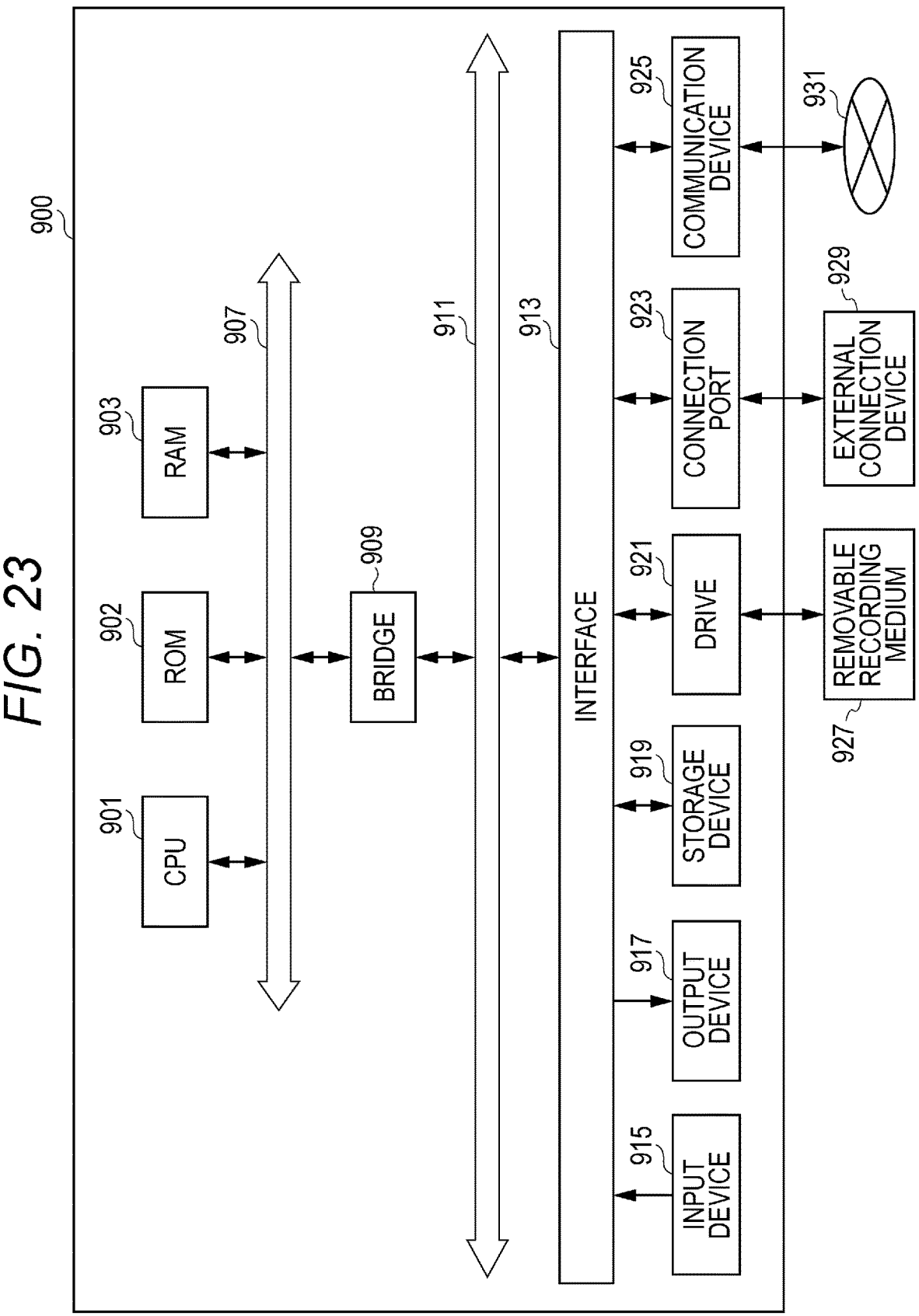
FIG. 23 is a functional block diagram showing an example of a hardware configuration of an information processing device included in the information processing system according to the same embodiment.

First, in a case where a configuration corresponding to the above-mentioned information processing device 10 is implemented as a device capable of independent operation (hereinafter also referred to as "information processing device 900" for convenience) such as a PC, a smartphone, and a server, an example of a hardware configuration of the information processing device 900 will be described in detail with reference to FIG. 23. FIG. 23 is a functional block diagram showing an example of a hardware configuration of the information processing device 900 included in the information processing system according to the embodiment of the present disclosure.

The information processing device 900 included in the information processing system 1 according to the present embodiment mainly includes a CPU 901, a ROM 902, and a RAM 903. Additionally, the information processing device 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls the overall operation or a part of the operation in the information processing device 900 according to various programs recorded in the ROM 902, the RAM 903, the storage device 919, or a removable recording medium 927. The ROM 902 stores programs, calculation parameters, and the like, used by the CPU 901. The RAM 903 temporarily stores programs used by the CPU 901, and parameters and the like that appropriately change in the execution of the programs. The components are mutually connected by the host bus 907 including an internal bus such as a CPU bus. Note that the recognition processing unit 101, the prediction processing unit 103, the drawing processing unit 105, the correction processing unit 109, and the output control unit 111 described above with reference to FIG. 8 can be implemented by the CPU 901, for example.

The host bus 907 is connected to the external bus 911 such as a peripheral component interconnect/interface (PCI) bus through the bridge 909. Additionally, the input device 915, the output device 917, the storage device 919, the drive 921, the connection port 923, and the communication device 925 are connected to the external bus 911 through the interface 913.

The input device 915 is operation means operated by the user, such as a mouse, a keyboard, a touch panel, a button, a switch, a lever, and a pedal, for example. Additionally, the input device 915 may be remote control means (so-called remote controller) using infrared rays or other radio waves, or may be an external connection device 929 such as a mobile phone or a PDA corresponding to the operation of the information processing device 900, for example. Moreover, the input device 915 includes, for example, an input control circuit or the like that generates an input signal on the basis of information input by the user using the above operation means, and outputs the generated input signal to the CPU 901. The user of the information processing device 900 can input various data and gives an instruction on processing operations to the information processing device 900 by operating the input device 915.

The output device 917 includes a device capable of visually or aurally notifying the user of the acquired information. Examples of such a device include display devices such as a CRT display device, a liquid crystal display device, a plasma display device, an EL display device, and a lamp, sound output devices such as a speaker and a headphone, and a printer device. The output device 917 outputs results obtained from various processing performed by the information processing device 900, for example. Specifically, the display device displays the results obtained by various processing performed by the information processing device 900 as text or image. On the other hand, the sound output device converts an audio signal including reproduced speech data, sound data, and the like into an analog signal and outputs the analog signal. Note that the output unit 211 described above with reference to FIG. 8 can be implemented by the output device 917, for example.

The storage device 919 is a device for data storage as an example of a storage unit of the information processing device 900. The storage device 919 includes, for example, a magnetic storage device such as a hard disk drive (HDD), a semiconductor storage device, an optical storage device, a magneto-optical storage device, or the like. The storage device 919 stores programs executed by the CPU 901, various data, and the like. Note that the storage unit 191 and the frame buffer 107 described with reference to FIG. 8 can be implemented by any one of the storage device 919 and the RAM 903, or a combination thereof.

The drive 921 is a reader/writer for a recording medium, and is built in or externally attached to the information processing device 900. The drive 921 reads information recorded in the removable recording medium 927 such as a mounted magnetic disk, optical disk, magneto-optical disk, or semiconductor memory, and outputs the information to the RAM 903. Additionally, the drive 921 can also write a record on the removable recording medium 927 such as a mounted magnetic disk, optical disk, magneto-optical disk, or semiconductor memory. The removable recording medium 927 is, for example, a DVD medium, an HD-DVD medium, a Blu-ray (registered trademark) medium, or the like. Additionally, the removable recording medium 927 may be a compact flash (registered trademark) (CF), a flash memory, a secure digital (SD) memory card, or the like. Additionally, the removable recording medium 927 may be, for example, an integrated circuit (IC) card equipped with a non-contact type IC chip, an electronic device, or the like.

The connection port 923 is a port for directly connecting to the information processing device 900. Examples of the connection port 923 include a universal serial bus (USB) port, an IEEE1394 port, a small computer system interface (SCSI) port, and the like. Other examples of the connection port 923 include an RS-232C port, an optical audio terminal, a high-definition multimedia interface (HDMI) (registered trademark) port, and the like. By connecting the external connection device 929 to the connection port 923, the information processing device 900 acquires various data directly from the external connection device 929 or provides various data to the external connection device 929.

The communication device 925 is a communication interface including a communication device or the like for connecting to a communication network 931, for example. The communication device 925 is a communication card or the like for wired or wireless local area network (LAN), Bluetooth (registered trademark), or wireless USB (WTJSB), for example. Additionally, the communication device 925 may be a router for optical communication, a router for asymmetric digital subscriber line (ADSL), a modem for various communications, or the like. The communication device 925 can transmit and receive signals and the like according to a predetermined protocol such as TCP/IP, for example, with the Internet or another communication device, for example. Additionally, the communication network 931 connected to the communication device 925 includes a network or the like connected by wire or wirelessly, and may be, for example, the Internet, a home LAN, infrared communication, radio wave communication, satellite communication, or the like.

Hereinabove, an example of a hardware configuration capable of implementing the functions of the information processing device 900 included in the information processing system 1 according to the embodiment of the present disclosure has been shown. Each of the components described above may be implemented using a general-purpose member, or may be implemented by hardware specialized for the function of each component. Accordingly, it is possible to change the hardware configuration to be used, as appropriate, according to the technical level on each occasion of carrying out the present embodiment. Note that although not shown in FIG. 23, various configurations corresponding to the information processing device 900 included in the information processing system 1 according to the present embodiment are naturally provided.

Note that a computer program for implementing each function of the information processing device 900 included in the information processing system 1 according to the present embodiment as described above can be prepared and be implemented on a personal computer or the like. Additionally, a computer readable recording medium in which such a computer program is stored can be also provided. The recording medium is, for example, a magnetic disk, an optical disk, a magneto-optical disk, a flash memory, or the like. Additionally, the above computer program may be distributed through a network, for example, without using a recording medium. Additionally, the number of computers that execute the computer program is not particularly limited. For example, the computer program may be executed by multiple computers (e.g., multiple servers and the like) in cooperation with each other. Note that a single computer or a system in which multiple computers cooperate is also referred to as a "computer system".

Hereinabove, an example of a hardware configuration of the information processing device 900 in the case where a configuration corresponding to the above-mentioned information processing device 10 is implemented as the information processing device 900 capable of independent operation such as a PC, a smartphone, and a server has been described in detail with reference to FIG. 23.

4.2. Configuration Example when Implemented as Chip

Figure 24:
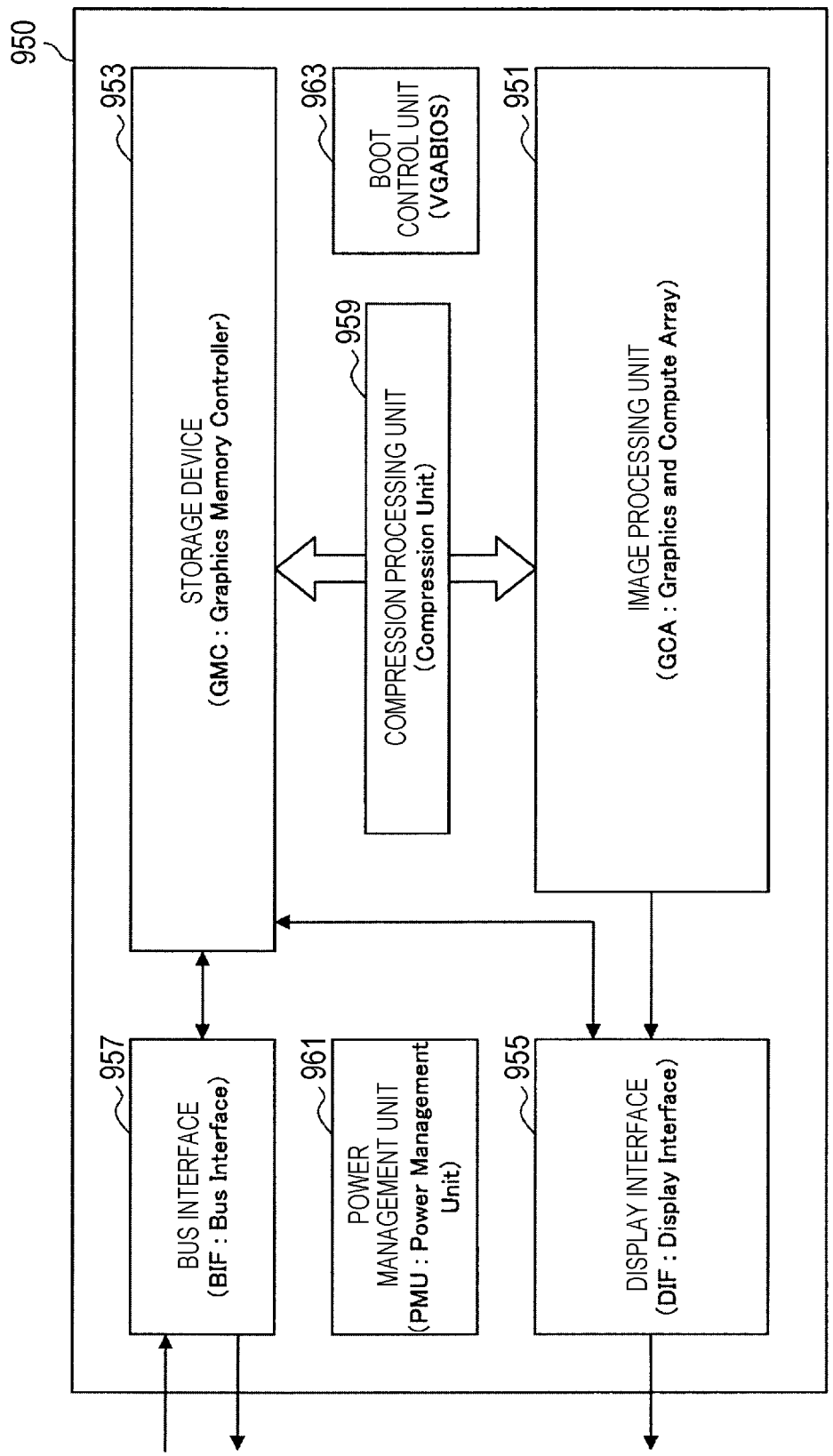
FIG. 24 is a functional block diagram showing an example of a hardware configuration in a case where an information processing device included in the information processing system according to the same embodiment is implemented as a chip.

Subsequently, in a case where a configuration corresponding to the above-mentioned information processing device 10 is implemented as a chip (hereinafter also referred to as "chip 950" for convenience) such as a GPU, an example of a hardware configuration of the chip 950 will be described in detail with reference to FIG. 24. FIG. 24 is a functional block diagram showing an example of a hardware configuration in the case where the information processing device included in the information processing system according to the embodiment of the present disclosure is implemented as a chip.

As shown in FIG. 24, the chip 950 includes an image processing unit (GCA: graphics and compute array) 951, a storage device (GMC: graphics memory controller) 953, a display interface (DIF) 955, a bus interface (BIF) 957, a power management unit (PMU) 961, and a boot control unit (VGABIOS) 963. Additionally, a compression processing unit (compression unit) 959 may be interposed between the image processing unit 951 and the storage device 953.

The image processing unit 951 corresponds to a processor that performs various processing related to image processing. As a specific example, the image processing unit 951 performs various arithmetic processing such as the above-mentioned processing related to projection of an object, processing related to drawing display information according to the result of the projection, and processing related to correction of the display information such as reprojection. Additionally, at this time, the image processing unit 951 may read the data stored in the storage device 953 and use the data for performing various arithmetic processing. Note that the processing of each of the recognition processing unit 101, the prediction processing unit 103, the drawing processing unit 105, the correction processing unit 109, and the output control unit 111 described above with reference to FIG. 8 can be implemented by arithmetic processing by the image processing unit 951, for example.

The storage device 953 is a configuration for temporarily or permanently storing various data. As a specific example, the storage device 953 may store data according to the execution results of various arithmetic processing by the image processing unit 951. The storage device 953 can be implemented on the basis of a technology such as video RAM (VRAM), window RAM (WRAM), multibank DRAM (MDRAM), double-data-rate (DDR), Graphics DDR (GDDR), and high bandwidth memory (HBM), for example.

The compression processing unit 959 compresses and decompresses various data. As a specific example, the compression processing unit 959 may compress data according to the result of processing by the image processing unit 951 when the data is stored in the storage device 953. Additionally, when the image processing unit 951 reads data stored in the storage device 953, the compression processing unit 959 may decompress the data if the data is compressed.

The display interface 955 is an interface for the chip 950 to send and receive data to and from a display (e.g., output unit 211 shown in FIG. 8). As a specific example, the result of drawing the display information by the image processing unit 951 is output to the display through the display interface 955. Additionally, as another example, in a case where the result of drawing the display information by the image processing unit 951 is held in the storage device 953, the result of the drawing held in the storage device 953 is output to the display through the display interface 955.

The bus interface 957 is an interface for the chip 950 to send and receive data to and from other devices and external devices. As a specific example, data stored in the storage device 953 is transmitted to other devices or external devices through the bus interface 957. Additionally, data transmitted from other devices or external devices is input to the chip 950 through the bus interface 957. Note that the data input to the chip 950 is stored in the storage device 953, for example.

The power management unit 961 is a configuration for controlling the supply of electric power to each part of the chip 950.

The boot control unit 963 is a configuration for performing various processing related to booting and managing and controlling input/output of information, for example, at the time of booting of the chip 950. The boot control unit 963 corresponds to a so-called video graphics array basic input/output system (VGABIOS).

Hereinabove, an example of a hardware configuration of the chip 950 in the case where a configuration corresponding to the above-mentioned information processing device 10 is implemented as the chip 950 such as a GPU has been described in detail with reference to FIG. 24. Note that in the present disclosure, the term "information processing device" includes not only the case of implementation as one device as shown in FIG. 23, but may also include the case of implementation as a chip (in other words, part) built into a device as shown in FIG. 24.

5. CONCLUSION

As described above, in an information processing system according to the embodiment of the present disclosure, the information processing device includes an acquisition unit, a projection processing unit, a correction processing unit, and an output control unit. The acquisition unit acquires information according to the recognition result of the position and posture of the viewpoint. The projection processing unit projects the target object onto a first projection surface defined in association with a first viewpoint on the basis of the position and posture of the first viewpoint, and associates second information according to the relative position and posture relationship between the first viewpoint and the object with first information according to the result of the projection. The correction processing unit restores three-dimensional information of the object on the basis of the first information and the second information, and reprojects the object according to the relative position and posture relationship between the restored object and the second viewpoint onto a second projection surface defined in association with the second viewpoint. The output control unit causes the output unit to present display information according to the result of the reprojection.

With the above configuration, even in a situation where correction (processing corresponding to so-called Reprojection) according to the position and posture of the viewpoint is applied to display information according to the projection result of an object, it is possible to more accurately reflect the three-dimensional position and posture relationship between the viewpoint and the object. That is, according to the information processing system according to the present embodiment, in a situation where information is presented to the user according to changes in the position and posture of the viewpoint, it is possible to more preferably correct deviation of the superimposed position of display information corresponding to processing delay between detection of movement of the viewpoint and presentation of information.

Hereinabove, the preferred embodiments of the present disclosure have been described in detail with reference to the accompanying drawings. However, the technical scope of the present disclosure is not limited to such examples. It will be apparent to those skilled in the art of the present disclosure that various changes or modifications can be conceived within the scope of the technical idea described in the claims. It is understood that these also belong to the technical scope of the present disclosure, as a matter of course.

Additionally, the effects described in the present specification are merely illustrative or exemplary, and are not limiting. That is, the technology according to the present disclosure can exhibit other effects apparent to those skilled in the art from the description of the present specification, in addition to or instead of the effects described above.

As a specific example, while the above description mainly focuses on an example assuming application of AR technology, application of the technology according to the embodiment of the present disclosure is not necessarily limited. That is, the technology according to the embodiment of the present disclosure is applicable to any situation where virtual information such as various contents is presented according to changes in the position and posture of the viewpoint. As a specific example, in the case of presenting information on the basis of VR technology according to the position and posture of the viewpoint, too, application of the technology according to the embodiment of the present disclosure can bring about the effect of enabling presentation of information in a more preferable manner.

Note that the following configurations are also within the technical scope of the present disclosure.

(1)

An information processing device including:
an acquisition unit that acquires information according to a recognition result of the position and posture of a viewpoint;
a projection processing unit that projects a target object on the basis of the position and posture of a first viewpoint onto a first projection surface defined in association with the first viewpoint, and associates second information according to the relative position and posture relationship between the first viewpoint and the object with first information according to a result of the projection;
a correction processing unit that restores three-dimensional information of the object on the basis of the first information and the second information, and reprojects the object according to the relative position and posture relationship between the restored object and a second viewpoint onto a second projection surface defined in association with the second viewpoint; and an output control unit that causes an output unit to present display information according to a result of the reprojection.

(2)

The information processing device according to (1) above, in which the second information includes information regarding a distance between the first viewpoint and the object.

(3)

The information processing device according to (1) or (2) above, in which
the acquisition unit acquires third information regarding movement of the object,
the projection processing unit associates the third information with the first information, and
the correction processing unit estimates, on the basis of the third information, movement of the object during a period in which the position and posture of the viewpoint change between the first viewpoint and the second viewpoint, and restores three-dimensional information of the object according to a result of the estimation.

(4)

The information processing device according to (3) above, in which the third information includes information regarding a direction in which the object moves and information regarding a speed of the object.

(5)

The information processing device according to (3) or (4) above, in which
the correction processing unit
corrects three-dimensional information of the restored object according to movement of the object based on the third information, and
reprojects the corrected object onto the second projection surface.

(6)

The information processing device according to any one of (1) to (5) above, in which
the projection processing unit projects the object onto the first projection surface corresponding to the first viewpoint for each of multiple first viewpoints having different positions and postures, and
the correction processing unit restores three-dimensional information of the object on the basis of the second information according to a projection result of the object for each of the multiple first viewpoints, and reprojects the restored object onto the second projection surface.

(7)

The information processing device according to (6) above, in which the correction processing unit restores three-dimensional information of the object by complementing information corresponding to a part of the object not included in the second information corresponding to some of the first viewpoints among the multiple first viewpoints with information corresponding to the part included in the second information corresponding to another first viewpoint.

(8)

The information processing device according to any one of (1) to (7) above, in which
the acquisition unit acquires the first information for each part of the object,
the projection processing unit projects the object for each of the parts onto the first projection surface, and associates the first information corresponding to the part with a projection result of the part, and
the correction processing unit restores three-dimensional information of the object for each of the parts, and reprojects the restored object for each of the parts onto the second projection surface.

(9)

The information processing device according to (8) above, in which the part of the object includes at least any of one or more edges, one or more vertices, or one or more voxels included in the object.

(10)

The information processing device according to any one of (1) to (9) above, in which
in a case where at least a part of a result of the reprojection of a first object onto the second projection surface and at least a part of a result of the reprojection of a second object different from the first object onto the second projection surface overlap,
the correction processing unit
performs control so that the display information corresponding to an object closer to the second viewpoint among the first object and the second object is preferentially displayed.

(11)

The information processing device according to any one of (1) to (10) above, in which
the acquisition unit acquires information according to a recognition result of a body in real space,
the projection processing unit acquires, on the basis of the position and posture of the first viewpoint, fourth information according to the relative position and posture relationship between the first viewpoint and the body, and
the correction processing unit
restores three-dimensional information of the body on the basis of the fourth information, and
reprojects the restored object onto the second projection surface according to the relative position and posture relationship among the restored body, the restored object, and the second viewpoint.

(12)

The information processing device according to any one of (1) to (11) above, in which
- the projection processing unit associates identification information of the object with the first information according to a result of projection of the object onto the first projection surface, and
- the correction processing unit identifies the object on the basis of the identification information associated with the first information, and restores three-dimensional information of the object.

(13)

The information processing device according to any one of (1) to (12) above, in which for each of a first subarea and a second subarea included in a display area of the output unit, the output control unit reprojects the restored object onto the second projection surface on the basis of positions and postures of the second viewpoints at different timings.

(14)

The information processing device according to (13) above, in which
the output control unit controls, at different timings,
- presentation in the first subarea of first display information according to a result of the reprojection for the first subarea, and
- presentation in the second subarea of second display information according to a result of the reprojection for the second subarea.

(15)

The information processing device according to any one of (1) to (14) above, in which the correction processing unit performs processing related to the reprojection in a shorter cycle than a cycle of processing related to the projection by the projection processing unit.

(16)

The information processing device according to any one of (1) to (15) above, in which the projection processing unit controls the position in which to fix the object in real space, so that the object is superimposed on a body in real space according to a recognition result of the position and the posture of the viewpoint.

(17)

The information processing device according to any one of (1) to (16) above, in which the output unit is a transmissive output unit.

(18)

The information processing device according to (17) above, further including a support unit that supports a display area of the output unit so that the display area is located in front of the user's eyes when worn on the user's head.

(19)

An information processing method performed by a computer, the method including:
- acquiring information according to a recognition result of the position and posture of a viewpoint;
- projecting a target object on the basis of the position and posture of a first viewpoint onto a first projection surface defined in association with the first viewpoint, and associating second information according to the relative position and posture relationship between the first viewpoint and the object with first information according to a result of the projection;
- restoring three-dimensional information of the object on the basis of the first information and the second information, and reprojecting the object according to the relative position and posture relationship between the restored object and a second viewpoint onto a second projection surface defined in association with the second viewpoint; and
- causing an output unit to present display information according to a result of the reprojection.

(20)

A program that causes a computer to acquire information according to a recognition result of the position and posture of a viewpoint,
- project a target object on the basis of the position and posture of a first viewpoint onto a first projection surface defined in association with the first viewpoint, and associate second information according to the relative position and posture relationship between the first viewpoint and the object with first information according to a result of the projection,
- restore three-dimensional information of the object on the basis of the first information and the second information, and reproject the object according to the relative position and posture relationship between the restored object and a second viewpoint onto a second projection surface defined in association with the second viewpoint, and
- cause an output unit to present display information according to a result of the reprojection.

REFERENCE SIGNS LIST

1 Information processing system
10 Information processing device
20 Input/output device
101 Recognition processing unit
103 Prediction processing unit
105 Drawing processing unit
107 Frame buffer
109 Correction processing unit
111 Output control unit
191 Storage unit
211 Output unit
251 Detection unit

The invention claimed is:

1. An information processing device comprising:
an acquisition unit that acquires information according to a recognition result of the position and posture of a viewpoint;
a projection processing unit that projects a target object on a basis of the position and posture of a first viewpoint onto a first projection surface defined in association with the first viewpoint, and associates second information according to the relative position and posture relationship between the first viewpoint and the object with first information according to a result of the projection;
a correction processing unit that restores three-dimensional information of the object on a basis of the first information and the second information, and reprojects the object according to the relative position and posture relationship between the restored object and a second viewpoint onto a second projection surface defined in association with the second viewpoint; and
an output control unit that causes an output unit to present display information according to a result of the reprojection, wherein the acquisition unit, the projection processing unit, the correction processing unit, and the output control unit are each implemented via at least one processor.

2. The information processing device according to claim 1, wherein the second information includes information regarding a distance between the first viewpoint and the object.

3. The information processing device according to claim 1, wherein
the acquisition unit acquires third information regarding movement of the object,
the projection processing unit associates the third information with the first information, and
the correction processing unit estimates, on a basis of the third information, movement of the object during a period in which the position and posture of the viewpoint change between the first viewpoint and the second viewpoint, and restores three-dimensional information of the object according to a result of the estimation.

4. The information processing device according to claim 3, wherein the third information includes information regarding a direction in which the object moves and information regarding a speed of the object.

5. The information processing device according to claim 3, wherein
the correction processing unit
corrects three-dimensional information of the restored object according to movement of the object based on the third information, and
reprojects the corrected object onto the second projection surface.

6. The information processing device according to claim 1, wherein
the projection processing unit projects the object onto the first projection surface corresponding to the first viewpoint for each of a plurality of the first viewpoints having different positions and postures, and
the correction processing unit restores three-dimensional information of the object on a basis of the second information according to a projection result of the object for each of the plurality of the first viewpoints, and reprojects the restored object onto the second projection surface.

7. The information processing device according to claim 6, wherein the correction processing unit restores three-dimensional information of the object by complementing information corresponding to a part of the object not included in the second information corresponding to some of the first viewpoints among the plurality of the first viewpoints with information corresponding to the part included in the second information corresponding to another first viewpoint.

8. The information processing device according to claim 1, wherein
the acquisition unit acquires the first information for each part of the object,
the projection processing unit projects the object for each of the parts onto the first projection surface, and associates the first information corresponding to the part with a projection result of the part, and
the correction processing unit restores three-dimensional information of the object for each of the parts, and reprojects the restored object for each of the parts onto the second projection surface.

9. The information processing device according to claim 8, wherein the part of the object includes at least any of one or more edges, one or more vertices, or one or more voxels included in the object.

10. The information processing device according to claim 1, wherein
in a case where at least a part of a result of the reprojection of a first object onto the second projection surface and at least a part of a result of the reprojection of a second object different from the first object onto the second projection surface overlap,
the correction processing unit
performs control so that the display information corresponding to an object closer to the second viewpoint among the first object and the second object is preferentially displayed.

11. The information processing device according to claim 1, wherein
the acquisition unit acquires information according to a recognition result of a body in real space;
the projection processing unit acquires, on a basis of the position and posture of the first viewpoint, fourth information according to the relative position and posture relationship between the first viewpoint and the body; and
the correction processing unit
restores three-dimensional information of the body on a basis of the fourth information, and
reprojects the restored object onto the second projection surface according to the relative position and posture relationship among the restored body, the restored object, and the second viewpoint.

12. The information processing device according to claim 1, wherein
the projection processing unit associates identification information of the object with the first information according to a result of projection of the object onto the first projection surface, and
the correction processing unit identifies the object on a basis of the identification information associated with the first information, and restores three-dimensional information of the object.

13. The information processing device according to claim 1, wherein for each of a first subarea and a second subarea included in a display area of the output unit, the output control unit reprojects the restored object onto the second projection surface on a basis of positions and postures of the second viewpoints at different timings.

14. The information processing device according to claim 13, wherein
the output control unit controls, at different timings,
presentation in the first subarea of first display information according to a result of the reprojection for the first subarea, and
presentation in the second subarea of second display information according to a result of the reprojection for the second subarea.

15. The information processing device according to claim 1, wherein the correction processing unit performs processing related to the reprojection in a shorter cycle than a cycle of processing related to the projection by the projection processing unit.

16. The information processing device according to claim 1, wherein the projection processing unit controls the position in which to fix the object in real space, so that the object is superimposed on a body in real space according to a recognition result of the position and the posture of the viewpoint.

17. The information processing device according to claim 1, wherein the output unit is a transmissive output unit.

18. The information processing device according to claim 17, further comprising a support unit that supports a display area of the output unit so that the display area is located in front of the user's eyes when worn on the user's head.

19. An information processing method performed by a computer, the method comprising:
   acquiring information according to a recognition result of the position and posture of a viewpoint;
   projecting a target object on a basis of the position and posture of a first viewpoint onto a first projection surface defined in association with the first viewpoint, and associating second information according to the relative position and posture relationship between the first viewpoint and the object with first information according to a result of the projection;
   restoring three-dimensional information of the object on a basis of the first information and the second information, and reprojecting the object according to the relative position and posture relationship between the restored object and a second viewpoint onto a second projection surface defined in association with the second viewpoint; and
   causing an output unit to present display information according to a result of the reprojection.

20. A non-transitory computer-readable medium having embodied thereon a program, which when executed by a computer causes the computer to execute a method, the method comprising:
   acquiring information according to a recognition result of the position and posture of a viewpoint,
   projecting a target object on a basis of the position and posture of a first viewpoint onto a first projection surface defined in association with the first viewpoint, and associating second information according to the relative position and posture relationship between the first viewpoint and the object with first information according to a result of the projection,
   restoring three-dimensional information of the object on a basis of the first information and the second information, and reprojecting the object according to the relative position and posture relationship between the restored object and a second viewpoint onto a second projection surface defined in association with the second viewpoint, and
   causing an output unit to present display information according to a result of the reprojection.

\* \* \* \* \*